(12) United States Patent
Aggarwal et al.

(10) Patent No.: US 9,166,807 B2
(45) Date of Patent: Oct. 20, 2015

(54) TRANSMISSION OF LAYER TWO (L2) MULTICAST TRAFFIC OVER MULTI-PROTOCOL LABEL SWITCHING NETWORKS

(75) Inventors: Rahul Aggarwal, San Francisco, CA (US); Yakov Rekhter, New Rochelle, NY (US); Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1415 days.

(21) Appl. No.: 12/404,786

(22) Filed: Mar. 16, 2009

(65) Prior Publication Data

US 2009/0175274 A1 Jul. 9, 2009

Related U.S. Application Data

(63) Continuation-in-part of application No. 11/192,432, filed on Jul. 28, 2005.

(60) Provisional application No. 61/110,129, filed on Oct. 31, 2008.

(51) Int. Cl.
| | |
|---|---|
| H04L 12/28 | (2006.01) |
| H04L 12/18 | (2006.01) |
| H04L 12/761 | (2013.01) |
| H04L 12/723 | (2013.01) |
| H04Q 11/00 | (2006.01) |

(52) U.S. Cl.
CPC .......... H04L 12/1886 (2013.02); H04L 45/16 (2013.01); H04L 45/50 (2013.01)

(58) Field of Classification Search
None
See application file for complete search history.

(56) References Cited

U.S. PATENT DOCUMENTS

| | | |
|---|---|---|
| 5,600,642 A | 2/1997 | Pauwels et al. |
| 6,374,303 B1 | 4/2002 | Armitage et al. |

(Continued)

FOREIGN PATENT DOCUMENTS

| | | |
|---|---|---|
| JP | 2005-086222 | 3/2005 |
| JP | 2005-130258 | 5/2005 |

(Continued)

OTHER PUBLICATIONS

Office Action from U.S. Appl. No. 11/666,480, dated Nov. 27, 2009, 36 pp.

(Continued)

*Primary Examiner* — Ayaz Sheikh
*Assistant Examiner* — Sori Aga
(74) *Attorney, Agent, or Firm* — Shumaker & Sieffert, P.A.

(57) ABSTRACT

Principles of the invention relate to techniques for transmission of Layer 2 (L2) traffic over a point to multi-point (P2MP) label switched path (LSP) within a multi-protocol Label Switching (MPLS) network. A source or ingress network device may implement the techniques to connect multiple L2 interfaces to a P2MP LSP within an MPLS network via a P2MP Pseudo-Wire (PW) mechanism that emulates delivery of L2 data units over a packet switched network, such as the MPLS network. The ingress network device first establishes the P2MP LSP and then connects two or more L2 interfaces to the P2MP LSP via the P2MP PW mechanism. Egress network devices may also implement the techniques to terminate the P2MP LSP and de-multiplex traffic arriving via multiple P2MP PWs carried over the same P2MP LSP.

34 Claims, 7 Drawing Sheets

(56) References Cited

U.S. PATENT DOCUMENTS

| | | | |
|---|---|---|---|
| 6,477,166 | B1 | 11/2002 | Sanzi et al. |
| 6,493,349 | B1 | 12/2002 | Casey |
| 6,501,754 | B1 | 12/2002 | Ohba et al. |
| 6,553,028 | B1 | 4/2003 | Tang et al. |
| 6,597,703 | B1 | 7/2003 | Li et al. |
| 6,611,528 | B1 | 8/2003 | Farinacci et al. |
| 6,625,773 | B1 | 9/2003 | Boivie et al. |
| 6,731,652 | B2 | 5/2004 | Ramfelt et al. |
| 6,751,218 | B1 | 6/2004 | Hagirahim et al. |
| 6,778,531 | B1 | 8/2004 | Kodialam et al. |
| 6,807,182 | B1 | 10/2004 | Dolphin et al. |
| 6,879,594 | B1 | 4/2005 | Lee et al. |
| 6,920,503 | B1 | 7/2005 | Nanji et al. |
| 6,968,389 | B1 | 11/2005 | Menditto et al. |
| 7,035,226 | B2 | 4/2006 | Enoki et al. |
| 7,039,687 | B1 | 5/2006 | Jamieson et al. |
| 7,082,102 | B1 | 7/2006 | Wright |
| 7,133,928 | B2 | 11/2006 | McCanne |
| 7,251,218 | B2 | 7/2007 | Jorgensen |
| 7,269,135 | B2 | 9/2007 | Frick et al. |
| 7,281,058 | B1 | 10/2007 | Shepherd et al. |
| 7,330,468 | B1 | 2/2008 | Tse-Au |
| 7,333,491 | B2 | 2/2008 | Chen et al. |
| 7,359,328 | B1 | 4/2008 | Allan |
| 7,360,084 | B1 | 4/2008 | Hardjono |
| 7,366,894 | B1 | 4/2008 | Kalimuthu et al. |
| 7,418,003 | B1 | 8/2008 | Alvarez et al. |
| 7,463,591 | B1 | 12/2008 | Kompella et al. |
| 7,477,642 | B2 | 1/2009 | Aggarwal et al. |
| 7,483,439 | B2 | 1/2009 | Shepherd et al. |
| 7,519,010 | B1 | 4/2009 | Aggarwal et al. |
| 7,522,599 | B1 | 4/2009 | Aggarwal et al. |
| 7,522,600 | B1 | 4/2009 | Aggarwal et al. |
| 7,545,735 | B1 | 6/2009 | Shabtay et al. |
| 7,558,219 | B1 | 7/2009 | Aggarwal et al. |
| 7,558,263 | B1 | 7/2009 | Aggarwal et al. |
| 7,564,803 | B1 | 7/2009 | Minei et al. |
| 7,564,806 | B1 | 7/2009 | Aggarwal et al. |
| 7,570,604 | B1 | 8/2009 | Aggarwal et al. |
| 7,570,605 | B1 | 8/2009 | Aggarwal et al. |
| 7,830,787 | B1 | 11/2010 | Wijnands et al. |
| 2002/0071390 | A1 | 6/2002 | Reeves et al. |
| 2002/0109879 | A1 | 8/2002 | Wing So |
| 2002/0118644 | A1 | 8/2002 | Moir |
| 2002/0181477 | A1 | 12/2002 | Mo et al. |
| 2002/0186664 | A1 | 12/2002 | Gibson et al. |
| 2002/0191584 | A1 | 12/2002 | Korus et al. |
| 2003/0012215 | A1 | 1/2003 | Novaes |
| 2003/0021282 | A1 | 1/2003 | Hospodor |
| 2003/0031175 | A1 | 2/2003 | Hayashi et al. |
| 2003/0043772 | A1 | 3/2003 | Mathis et al. |
| 2003/0056007 | A1 | 3/2003 | Katsube et al. |
| 2003/0063591 | A1 | 4/2003 | Leung et al. |
| 2003/0087653 | A1 | 5/2003 | Leung et al. |
| 2003/0088696 | A1 | 5/2003 | McCanne |
| 2003/0099235 | A1 | 5/2003 | Shin et al. |
| 2003/0108047 | A1 | 6/2003 | Mackiewich et al. |
| 2003/0112748 | A1 | 6/2003 | Puppa et al. |
| 2003/0123446 | A1 | 7/2003 | Muirhead et al. |
| 2003/0172114 | A1 | 9/2003 | Leung |
| 2003/0177221 | A1 | 9/2003 | Ould-Brahim et al. |
| 2003/0191937 | A1 | 10/2003 | Balissat et al. |
| 2003/0210705 | A1 | 11/2003 | Seddigh et al. |
| 2004/0037279 | A1 | 2/2004 | Zelig et al. |
| 2004/0042406 | A1 | 3/2004 | Wu et al. |
| 2004/0047342 | A1 | 3/2004 | Gavish et al. |
| 2004/0081154 | A1 | 4/2004 | Kouvelas |
| 2004/0151180 | A1 | 8/2004 | Hu et al. |
| 2004/0151181 | A1 | 8/2004 | Chu et al. |
| 2004/0165600 | A1 | 8/2004 | Lee |
| 2004/0190517 | A1 | 9/2004 | Gupta et al. |
| 2004/0213160 | A1 | 10/2004 | Regan et al. |
| 2004/0218536 | A1 | 11/2004 | Yasukawa et al. |
| 2004/0240445 | A1 | 12/2004 | Shin et al. |
| 2004/0240446 | A1 | 12/2004 | Compton |
| 2005/0001720 | A1 | 1/2005 | Mason et al. |
| 2005/0013295 | A1 | 1/2005 | Regan et al. |
| 2005/0018693 | A1 | 1/2005 | Dull |
| 2005/0027782 | A1 | 2/2005 | Jalan et al. |
| 2005/0097203 | A1 | 5/2005 | Unbehagen et al. |
| 2005/0108419 | A1 | 5/2005 | Eubanks |
| 2005/0111351 | A1 | 5/2005 | Shen |
| 2005/0129001 | A1 | 6/2005 | Backman et al. |
| 2005/0169270 | A1* | 8/2005 | Mutou et al. .................. 370/390 |
| 2005/0220132 | A1 | 10/2005 | Oman et al. |
| 2005/0232193 | A1 | 10/2005 | Jorgensen |
| 2005/0262232 | A1 | 11/2005 | Cuervo et al. |
| 2005/0265308 | A1 | 12/2005 | Barbir et al. |
| 2005/0271035 | A1 | 12/2005 | Cohen et al. |
| 2005/0271036 | A1 | 12/2005 | Cohen et al. |
| 2005/0281192 | A1 | 12/2005 | Nadeau et al. |
| 2006/0013141 | A1 | 1/2006 | Mutoh et al. |
| 2006/0039364 | A1 | 2/2006 | Wright |
| 2006/0047851 | A1 | 3/2006 | Voit et al. |
| 2006/0088031 | A1 | 4/2006 | Nalawade |
| 2006/0126496 | A1 | 6/2006 | Filsfils et al. |
| 2006/0147204 | A1 | 7/2006 | Yasukawa et al. |
| 2006/0153067 | A1 | 7/2006 | Vasseur et al. |
| 2006/0164975 | A1 | 7/2006 | Filsfils et al. |
| 2006/0182034 | A1 | 8/2006 | Klinker et al. |
| 2006/0221958 | A1 | 10/2006 | Wijnands et al. |
| 2007/0025277 | A1 | 2/2007 | Sajassi et al. |
| 2007/0036162 | A1 | 2/2007 | Tingle et al. |
| 2007/0076709 | A1* | 4/2007 | Mattson et al. ............... 370/389 |
| 2007/0098003 | A1 | 5/2007 | Boers et al. |
| 2007/0104119 | A1 | 5/2007 | Sarkar et al. |
| 2007/0124454 | A1 | 5/2007 | Watkinson |
| 2007/0140107 | A1 | 6/2007 | Eckert et al. |
| 2008/0056258 | A1 | 3/2008 | Sharma et al. |
| 2008/0123524 | A1 | 5/2008 | Vasseur et al. |
| 2008/0123654 | A1 | 5/2008 | Tse-Au |
| 2008/0291921 | A1 | 11/2008 | Du et al. |
| 2009/0028149 | A1 | 1/2009 | Yasukawa et al. |

FOREIGN PATENT DOCUMENTS

| | | |
|---|---|---|
| JP | 2005-167482 | 6/2005 |
| JP | 2005-252385 | 9/2005 |
| JP | 2005-323266 | 11/2005 |
| KR | 2004001206 | 1/2004 |
| WO | WO 02/091670 A2 | 11/2002 |
| WO | WO 2004/071032 A1 | 8/2004 |

OTHER PUBLICATIONS

Office Action from U.S. Appl. No. 11/192,432, dated Dec. 21, 2009, 21 pp.

Response to Office Action dated Nov. 27, 2009, for U.S. Appl. No. 11/566,480, filed Jan. 22, 2010, 18 pp.

Office Action from U.S. Appl. No. 11/213,638, dated Dec. 14, 2009, 26 pp.

Response to Office Action dated Dec. 14, 2009, from U.S. Appl. No. 11/213,638, filed Feb. 16, 2010, 6 pp.

Office Action from U.S. Appl. No. 11/213,640, dated Dec. 24, 2009, 26 pp.

Response to Office Action dated Dec. 24, 2009, from U.S. Appl. No. 11/213,640, filed Mar. 24, 2010, 13 pp.

Response to Office Action dated Dec. 21, 2009, from U.S. Appl. No. 11/192,432, filed Mar. 22, 2010, 14 pp.

L. Martini et al., "Transport of Layer 2 Frames Over MPLS," Network Working Group Internet Draft, draft-martini-l2circuit-trans-mpls-08.txt, Nov. 2001, 18 pgs.

L. Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

Eric C. Rosen et al., "Multicast in MPLS/BGP IP VPNs," draft-rosen-vpn-mcast-07.txt, May 2004, 27 pgs.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

(56) References Cited

OTHER PUBLICATIONS

K. Kompella et al., "Virtual Private LAN Service," draft-ietf-l2vpn-vpls-bgp-00.txt, May 2003, 22 pgs.

Y. Rekhter et al., "A Border Gateway Protocol 4 (BGP-4)," Mar. 1995, 72 pgs.

Aggarwal et al., "Establishing Point to Multipoint MPLS TE LSPs," IETF, submitted to Internet Engineering Task Force (IETF) Feb. 11, 2007, pp. 1-15.

Yasukawa et al. "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

D. Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2pgs. Printed Apr. 18, 2005, http://www.javvin.com/protocolRSVPTE.html.

Aggarwal et al., "MPLS Upstream Label Assignment for RSVP-TE and LDP," Aug. 24, 2005, http://www.tla-group.com/~mpls/ietf-63-mpls-upstream-rsvp-ldp.ppt, 8 pgs.

Fujita, N., "Dynamic Selective Replication Schemes for Content Delivery Networks," IPSJ SIG Notes, vol. 2001, No. 111, Information Processing Society of Japan, Nov. 21, 2001, 2 pgs.

Wijnands et al., "Multicast Extensions for LDP," Network Working Group, Internet Draft, Mar. 2005, 13 pgs.

Aggarwal et al., "MPLS Upstream Label Assignment and Context Specific Label Space," Network Working Group, Internet Draft, Jan. 2005, 9 pgs.

U.S. Appl. No. 11/213,638, entitled "Shared Multicast Trees for Multicast Virtual Private Networks," filed Aug. 26, 2005, Aggarwal et al.

U.S. Appl. No. 11/213,637, entitled "Aggregate Multicast Trees for Virtual Private Local Area Network (LAN) Service Multicast," filed Aug. 26, 2005, Aggarwal et al.

U.S. Appl. No. 11/213,639, entitled "Exchange of Control Information for Virtual Private Local Area Network (LAN) Service Multicast," filed Aug. 26, 2005, Aggarwal et al.

U.S. Appl. No. 11/213,640, entitled "Auto-Discovery of Multicast Virtual Private Networks," filed Aug. 26, 2005, Aggarwal et al.

U.S. Appl. No. 12/423,640, entitled Inter-Autonomous System (As) Multicast Virtual Private Networks, filed Apr. 14, 2009, Aggarwal et al.

U.S. Appl. No. 12/427,542, entitled "Transport of Control and Data Traffic for Multicast Virtual Private Networks," filed Apr. 21, 2009, Aggarwal et al.

U.S. Appl. No. 12/469,075, entitled "Exchange of Control Information for Virtual Private Local Area Network (LAN) Service Multicast," filed May 20, 2009, Aggarwal et al.

U.S. Appl. No. 12/497,078, entitled "Aggregate Multicast Trees for Multicast Virtual Private Networks," filed Jul. 2, 2009, Aggarwal et al.

U.S. Appl. No. 12/497,957, entitled "Reliable Exchange of Control Information for Multicast Virtual Private Networks," filed Jul. 6, 2009, Aggarwal et al.

U.S. Appl. No. 12/497,939, entitled "Multicast Trees for Virtual Private Local Area Network (LAN) Service Multicast," filed Jul. 6, 2009, Aggarwal et al.

U.S. Appl. No. 11/056,383, entitled "Fast Reroute of Traffic Associated With a Point to Multi-Point Network Tunnel," filed Feb. 10, 2005, Aggarwal.

U.S. Appl. No. 12/499,606, entitled "Point to Multi-Point Label Switched Paths With Label Distribution Protocol," filed Jul. 8, 2009, Minei et al.

U.S. Appl. No. 11/445,353, entitled "Forming Multicast Distribution Structures Using Exchanged Multicast Optimization Data," filed Jun. 1, 2006, Kompella.

U.S. Appl. No. 11/445,370, entitled "Forming Equal Cost Multipath Multicast Distribution Structures," filed Jun. 1, 2006, Kompella.

U.S. Appl. No. 11/508,096, entitled "Resource Reservation Protocol With Traffic Engineering Point to Multi-Point Label Switched Path Hierarchy," filed Aug. 22, 2006, Aggarwal et al.

U.S. Appl. No. 11/508,107, entitled "Upstream Label Assignment for the Resource Reservation Protocol With Traffic Engineering," filed Aug. 22, 2006, Aggarwal.

U.S. Appl. No. 11/566,480, entitled "Upstream Label Assignment for the Label Distribution Protocol," filed Dec. 4, 2006, Aggarwal.

Satyanarayana et al., "Extensions to GMPLS RSVP Graceful Restart", draft-aruns-ccamp-restart-ext-01.txt, Jul. 2004, Network Working Group Internet Draft, 23 pgs.

\* cited by examiner

TRANSMISSION OF LAYER TWO (L2) MULTICAST TRAFFIC OVER MULTI-PROTOCOL LABEL SWITCHING NETWORKS

This application is a continuation-in-part of U.S. patent application Ser. No. 11/192,432, filed Jul. 28, 2005 and claims the benefit of U.S. Provisional Application No. 61/110,129, filed Oct. 31, 2008, the entire contents of both being incorporated herein by reference.

TECHNICAL FIELD

The invention relates to computer networks and, more particularly, to transmission of multicast traffic within a computer network.

BACKGROUND

Customer networks are networks established by individuals or companies for internal communication. Customer networks may include local area networks (LANs) or wide area networks (WANs) that comprise a plurality of subscriber devices, such as personal computers, laptops, workstations, personal digital assistants (PDAs), wireless devices, network-ready appliances, file servers, print servers or other devices. The customer networks may meet customer-specific needs using one or more Layer 2 communication protocols, such as an Asynchronous Transfer Mode (ATM) protocol, an Ethernet protocol, a Bridged Ethernet protocol, a Frame Relay protocol.

These layer 2 protocols may transfer information in fixed-length data units, such as frames or cells. To transfer the data units, switches within a customer network often create a fixed network path, referred to as a virtual circuit. The frames transmitted by a source device within the customer network travel along the virtual circuit created by the switches. A destination device receives the data units from the virtual circuit, and reassembles the information from the data units.

Another popular network technology is the Internet Protocol (IP) networking protocol in which information is divided into variable-length blocks called packets. In contrast to fixed data unit protocols, such as the ATM protocol, IP-based networks individually route these packets, also referred to as "datagrams," across the network from a source device to a destination device. In other words, unlike the virtual circuits within a customer network, each packet can take a different route from the source to the destination device within the IP network. The destination device reorders the packets upon receipt, extracts the information from the packets, and assembles the information into its original form.

In order to allow remote customer networks to communicate, IP-based communication techniques are being developed that relay frames through one or more intermediate IP network, such as the Internet. According to these communication techniques, routing devices near an edge of the IP network, often referred to as edge routers, can receive frames from one of the customer networks via an L2 protocol, encapsulate the frames within packets, and route the packets through the IP network to the other customer network. Routing devices within the IP network maintain tables of routing information that describe available routes through the network.

Upon receiving an incoming packet, the routing device examines information within the packet and forwards the packet in accordance with the routing information. Some conventional systems use Multi-protocol Label Switching (MPLS) protocols to transport the L2 traffic through the intermediate networks. MPLS is a mechanism used to engineer traffic patterns within Internet Protocol (IP) networks. By utilizing MPLS, a source network device can request a static path through a network, i.e., a Label Switched Path (LSP), to carry MPLS packets from the source network device to a destination network device.

In some cases, a router within an IP network may receive a join request for a multicast group from a subscriber device within a customer network. When the router receives the L2 multicast traffic associated with the multicast group from a source network, the router forwards the multicast traffic to the requesting subscriber device. When two or more subscriber devices connected to the same router request to join the same multicast group, the source device sends an identical copy of the associated multicast traffic to the router for each of the requesting subscriber devices over the same connection. This is not bandwidth efficient as multicast traffic typically comprises high bandwidth data, audio, or video streams.

SUMMARY

In general, the principles of the invention allow point to multi-point (P2MP) LSPs to be used for L2 traffic transmission over a packet switched network. In particular, a network device may establish the P2MP LSP over the Packet Switched Network (PSN) and couple or connect two or more interfaces to the P2MP LSP, such that traffic from each of the two or more interfaces may be carried over the same P2MP LSP. In this manner, rather than configure a separate P2MP LSP for each of the two or more interface, the techniques may couple two or more interfaces to a single P2MP LSP to reduce overhead, such as state information, within the PSN.

In addition, the network device may establish the P2MP LSP via an auto-discovery procedure or mechanism, whereby the network device may automatically, without administrator or other user input, determine other network devices that are members of the same service, such as a Layer two (2) Virtual Private Network (L2VPN) service. Based on this membership, the network device may establish the P2MP LSP to interconnect or couple the network device to these other network devices. In this manner, the network device may further lessen network overhead and maintenance as the P2MP LSP may automatically, without requiring administrator input, configure a given P2MP LSP.

In operation, the network device may establish the P2MP LSP over the PSN either manually or automatically. Once established, the network device may couple two or more ingress L2 interfaces to the P2MP LSP. To couple the two or more ingress layer 2 (L2) interfaces, the network device may signal one or more P2MP Psuedo-Wires (PWs) downstream to the other network devices. Typically, the network device and the other network devices reside at the edge of the provider network, and may be referred to as Provider Edge (PE) device. A P2MP PW may comprise an abstraction or mechanism for emulating a native service, such as a L2 ATM service or Ethernet Service, over a layer 3 (L3) or Internet Protocol (IP) packet-based network (e.g., a PSN). Each P2MP PW may couple one or more ingress attachment circuits (ACs) of the network device, such as a physical L2 interface or a virtual or logical interface, to multiple egress ACs included within the other devices. By signaling the P2MP PWs in this manner, the network device may establish the one or more P2MP PWs over the P2MP LSP, such that a single P2MP LSP may carry the traffic for multiple P2MP PWs. Moreover, signaling typically only involves the PE devices and not transit devices positioned intermediate to the PE devices and, as a result, the P2MP PWs may be transparent to the transit devices.

After signaling the one or more P2MP PWs upstream, the network device may receive L2 network traffic via the one or more ingress ACs that couple the network device to one or more L2 or lower layer source networks. The network device may then encapsulate the network traffic within packets and transmit the packets downstream over the P2MP LSP via the P2MP PW. As each P2MP PW may receive traffic on multiple ACs, where each of the multiple ACs may comprise separate and distinct L2 interfaces, the techniques may facilitate connecting two or more L2 (or lower layer) interfaces to the same P2MP LSP through the P2MP PW abstraction. This in effect reduces network overhead by reducing the number of P2MP LSPs within the PSN, as the same P2MP LSP may now connect to multiple ingress L2 interfaces rather than a single P2MP LSP. Transit devices, in particular, may maintain less state information or overhead due to the decrease in P2MP LSPs and, as P2MP PWs are only signaled to the PE devices, transit devices need not maintain any overhead for P2MP PWs, resulting in a substantial decrease of state information for transit devices.

In one embodiment, a method comprises establishing, with a source device of a computer network, a point to multi-point (P2MP) label switched path (LSP) that connects the source device to multiple receiver devices included within the computer network, where the source device is configured to operate as an ingress to the P2MP LSP and the multiple receiver devices are configured to operate as egresses for the P2MP. The method further comprises connecting, with the source device, two or more ingress layer two (L2) interfaces of the source device to the P2MP LSP, and forwarding, with the source device, L2 data units from the two or more ingress L2 interfaces to the multiple receiver devices via the P2MP LSP.

In another embodiment, a network device comprises at least one layer two (L2) interface cards, the combination of L2 interface cards having collectively two or more ingress L2 interfaces and a control unit that establishes a point to multi-point (P2MP) label switched path (LSP) through a computer network to connect the source network device to multiple receiver devices and connect the two or more ingress L2 interfaces to the P2MP LSP, where the source device is configured to operate as an ingress to the P2MP LSP and the multiple receiver devices are configured to operate as egresses for the P2MP. The at least one L2 interface card forwards L2 data units from the two or more ingress L2 interfaces to the multiple receiver devices via the P2MP LSP.

In a further embodiment, a computer-readable storage medium comprising instructions that cause a programmable processor to establish, with a source device of a computer network, a point to multi-point (P2MP) label switched path (LSP) that connects the source device to multiple receiver devices included within the computer network, where the source device is configured to operate as an ingress to the P2MP LSP and the multiple receiver devices are configured to operate as egresses for the P2MP. The instructions further cause the programmable processor to connect, with the source device, two or more ingress layer two (L2) interfaces of the source device to the P2MP LSP and forward, with the source device, L2 data units from the two or more ingress L2 interfaces to the multiple receiver devices via the P2MP LSP.

In another embodiment, a system comprises a computer network, multiple receiver network devices included within the computer network, and a source network device included within the computer network. The source device includes at least one layer two (L2) interface cards, the combination of L2 interface cards having collectively two or more ingress L2 interfaces, and a control unit that establishes a point to multi-point (P2MP) label switched path (LSP) through a computer network to connect the source network device to multiple receiver devices and connect the two or more ingress L2 interfaces to the P2MP LSP, where the source device is configured to operate as an ingress to the P2MP LSP and the multiple receiver devices are configured to operate as egresses for the P2MP. The at least one L2 interface card forwards L2 data units from the two or more ingress L2 interfaces to the multiple receiver devices via the P2MP LSP.

In another embodiment, A network device comprises at least one layer two (L2) interface cards, the combination of L2 interface cards having collectively one or more egress L2 interfaces, and a control unit that establishes a point to multi-point (P2MP) label switched path (LSP) through a computer network to connect a source network device the network device, as one of multiple receiver devices, and connect one or more of the egress L2 interfaces to the P2MP LSP, where the source device is configured to operate as an ingress to the P2MP LSP and the multiple receiver devices are configured to operate as egresses for the P2MP. The at least one L2 interface card receives Multi-Protocol Label Switching (MPLS) packets from the source device via the P2MP LSP, wherein the MPLS packets include a L2 data unit, an outer label that identifies the P2MP LSP and an inner label selected for the L2 data unit to identify the P2MP PW. The control unit stores first and second mapping data, wherein the first mapping data maps the outer label of the MPLS packet to one of a plurality of context-specific label spaces, wherein the one of the plurality of context-specific label spaces comprises the second mapping data that maps the inner label of the MPLS packet to the at least one egress L2 interface. The control unit further receives the MPLS packet from the P2MP LSP, retrieves the outer and inner labels from the MPLS packet, accesses the first mapping data in response to retrieving the outer label to select the one of the context-specific label spaces associated with the outer label, accesses, in response to selecting the one of the context-specific label spaces, the second mapping to determine, based on the inner label, the at least one egress L2 interfaces on which to forward the L2 data units, and retrieves the L2 data units encapsulated within the MPLS packet. The at least one egress L2 interface forwards the retrieved L2 data units.

The details of one or more embodiments of the principles of the invention are set forth in the accompanying drawings and the description below. Other features, objects, and advantages of the invention will be apparent from the description and drawings, and from the claims.

DETAILED DESCRIPTION

Figure 1:
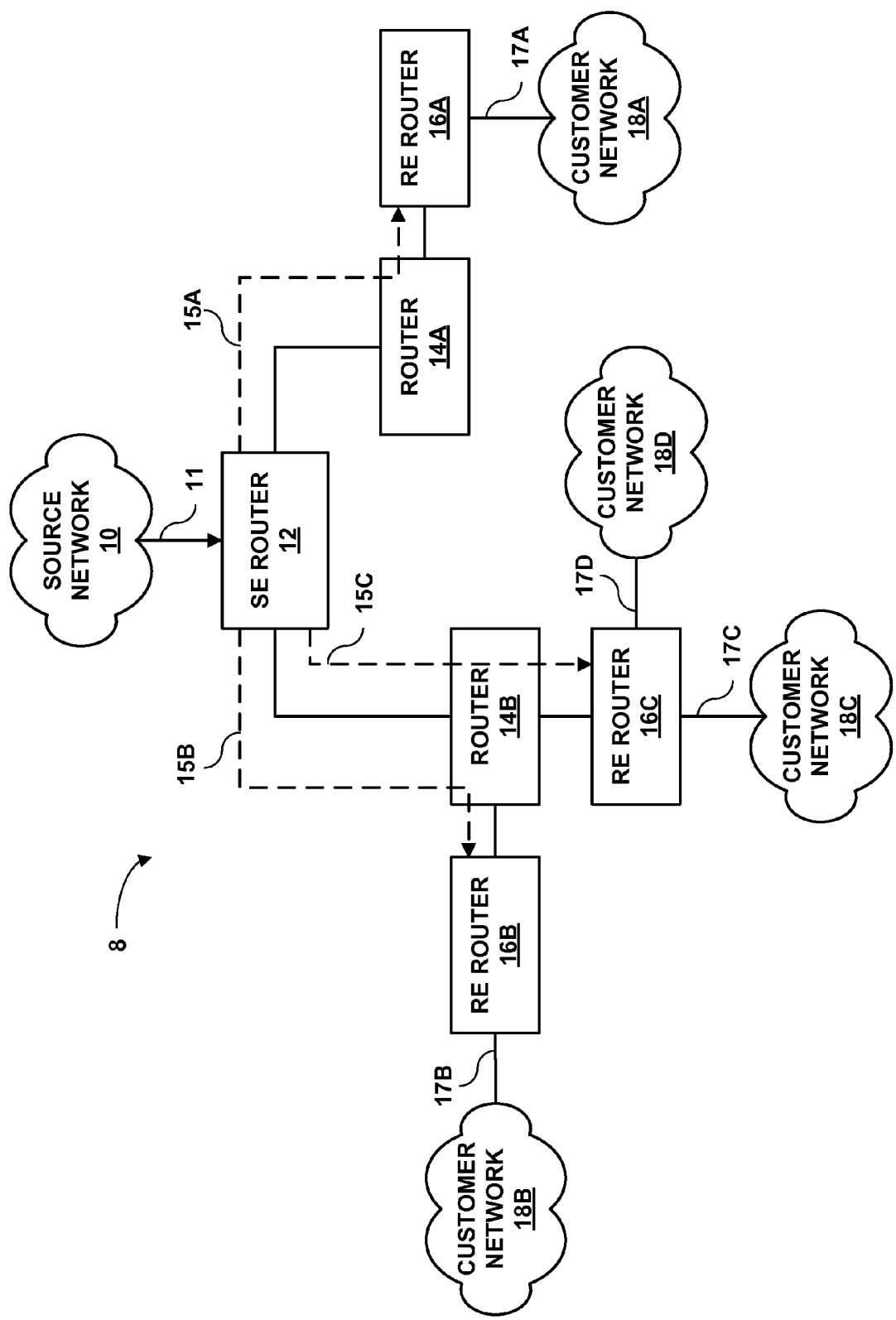
FIG. 1 is a block diagram illustrating an exemplary computer system in which layer two (L2) multicast traffic is transmitted across a Multi-protocol Label Switching (MPLS) network in accordance with the principles of the invention.

FIG. 1 is a block diagram illustrating an exemplary computer system in which Layer 2 (L2) multicast traffic is transmitted across a Multi-protocol Label Switching (MPLS) network 8 in accordance with the principles of the invention. In this example, MPLS network 8 includes a point to multi-point (P2MP) label switched path (LSP) 15 established between a source edge (SE) router 12 (also referred to as a SE network device) and multiple receiver edge (RE) routers 16A-16C ("RE routers 16") (which may generally represent RE network devices). Circuit cross-connect (CCC) switches are established within SE router 12 and each of RE routers 16 to allow L2 multicast traffic to be encapsulated as MPLS packets and transmitted across MPLS network 8 via P2MP LSPs. In this way, the invention is capable of migrating legacy L2 networks to MPLS networks In the illustrated embodiment, a source network 10 couples to SE router 12 of MPLS network 8 via an L2 interface 11. Source network 10 may comprise any public or private network that transmits L2 multicast traffic, such as high bandwidth data, audio, or video streams. Customer networks 18A-18D ("customer networks 18") couple to RE routers 16 via L2 interfaces 17A-17D ("L2 interfaces 17"). Customer networks 18 may include local area networks (LAN) or wide area networks (WAN) that comprise a plurality of subscriber devices, such as personal computers, laptops, workstations, personal digital assistants (PDAs), wireless devices, network-ready appliances, file servers, print servers or other devices.

Source network 10 and customer networks 18 may use non-IP protocols, such as an Asynchronous Transfer Mode (ATM) protocol, an Ethernet protocol, a Bridged Ethernet protocol, Frame Relay protocols, or other L2 communication protocols. For example, source network 10 and customer networks 18 may use the ATM communication protocol. The ATM protocol communicates information in fixed or variable-sized data units, referred to as frames or cells. In this case, L2 interface 11 may comprise an ATM virtual circuit over which source network 10 communicates the frames to SE router 12. L2 interfaces 17 may also comprise ATM virtual circuits over which RE routers 16 communicate frames to customer networks 18.

MPLS network 8 includes SE router 12, transit routers 14A and 14B, and RE routers 16. In the example of FIG. 1, SE router 12 uses RSVP-TE to establish point-to-point (P2P) LSPs to carry traffic between SE router 12 and each of RE routers 16 over routers 14A and 14B. A P2P LSP 15A is established between SE router 12 and RE router 16A coupled to customer network 18A via L2 interface 17A. A P2P LSP 15B is also established between SE router 12 and RE router 16B coupled to customer network 18B via L2 interface 17B. In addition, a P2P LSP 15C is established between SE router 12 and RE router 16C coupled to customer network 18C via L2 interface 17C and customer network 18D via L2 interface 17D.

P2MP LSP 15 is setup by merging the individual P2P LSPs 15A-15C and relying on multicast capabilities of MPLS network 8. P2P LSPs 15A-15C that are merged to form P2MP LSP 15 may each be referred to as "branch LSPs." The branch LSPs are each initiated by SE router 12. Hence, P2MP LSP 15 may be as efficient as trees setup by a multicast routing protocol in an IP network. However, P2MP LSP 15 is achieved without burdening RSVP-TE with any of the mechanisms of a multicast routing protocol. As a result, routers 12, 14, and 16 within MPLS network 8 need not run a multicast routing protocol to support multicast traffic.

A CCC switch (not shown in FIG. 1) is configured within the ingress router of P2MP LSP 15 (e.g., SE router 12) to transparently connect L2 interface 11 to P2MP LSP 15. CCC switches are also configured within each egress router of P2MP LSP 15 (i.e., RE routers 16) to transparently connect each leaf of P2MP LSP 15 to L2 interfaces 17. The CCC switches may be viewed as logical cross-connections for delivering L2 traffic (e.g., L2 data units such as Ethernet frames or ATM cells) to LSPs. The transparent cross-connections allow L2 multicast traffic to be encapsulated as MPLS packets regardless of the type of payload the L2 multicast traffic is carrying. More specifically, SE router 12 may route frames through MPLS network 8 by pre-pending MPLS headers on sets of frames to form MPLS packets.

Upon receiving frames or other data units from source network 10, for example, SE router 12 constructs an MPLS packet that includes one or more frames. SE router 12 routes the packet through MPLS network 8 to RE routers 16 via P2MP LSP 15. RE routers 16 disassemble the MPLS packets into individual frames, and forward the frames to their respective customer networks 18. Routers 14A and 14B within MPLS network 8 forward the MPLS packets without regard to the content of the frames. In this manner, routers 14A and 14B may relay frames of any type, including data and control frames, and need not disassemble or reassemble the information carried by the frames.

SE router 12, routers 14, and RE routers 16 maintain routing information that describes available routes through MPLS network 8. For example, the routing information may include the route of P2MP LSP 15. Upon receiving an incoming packet, the routers examine information within the packet and forward the packet in accordance with the routing information. In the case of a MPLS packet, the routers examine a label pushed onto the MPLS packet and swap the label based on the routing information. In order to maintain an accurate representation of network 8, the routers exchange routing information, e.g., bandwidth availability of links, in accordance with a defined routing protocol, such as an Interior Gateway Protocol (IGP).

Subscriber devices within customer networks 18 may send requests to join specific multicast groups to source network 10 over MPLS network 8. Source network 10 then forwards a single stream of the L2 multicast traffic associated with each of the requested multicast groups to SE router 12. SE router 12 cross-connects L2 interface 11 from source network 10 to P2MP LSP 15 via the CCC switch. SE router 12 encapsulates the L2 multicast traffic in MPLS packets and forwards the packets to customer networks 18 via P2MP LSP 15.

When subscriber devices with each of customer networks 18 request memberships in the same multicast group, SE router 12 may forward a copy of the associated multicast traffic encapsulated in a MPLS packet to both transit routers 14A and 14B. Transit router 14A may simply forward the MPLS packet along branch LSP 15A to RE router 16A. RE router 16A retrieves the L2 multicast traffic encapsulated in the MPLS packet and forwards the multicast stream to the requesting subscriber devices within customer network 18A over L2 interface 17A.

Transit router 14B, on the other hand, is responsible for replicating the MPLS packet when customer networks coupled to both RE router 16B and 16C request the same multicast traffic. Transit router 14B forwards one copy of the MPLS packet along branch LSP 15B to RE router 16B and forwards an identical copy of the MPLS packet along branch LSP 15C to RE router 16C. RE router 16B retrieves the L2 multicast traffic encapsulated in the MPLS packet and forwards the multicast stream to the requesting subscriber devices within customer network 18B over L2 interface 17B. RE router 16C retrieves the L2 multicast traffic encapsulated in the MPLS packet and forwards the multicast stream to the requesting subscriber devices within customer network 18C over L2 interface 17C and to the requesting subscriber devices within customer network 18D over L2 interface 17D.

Figure 2:
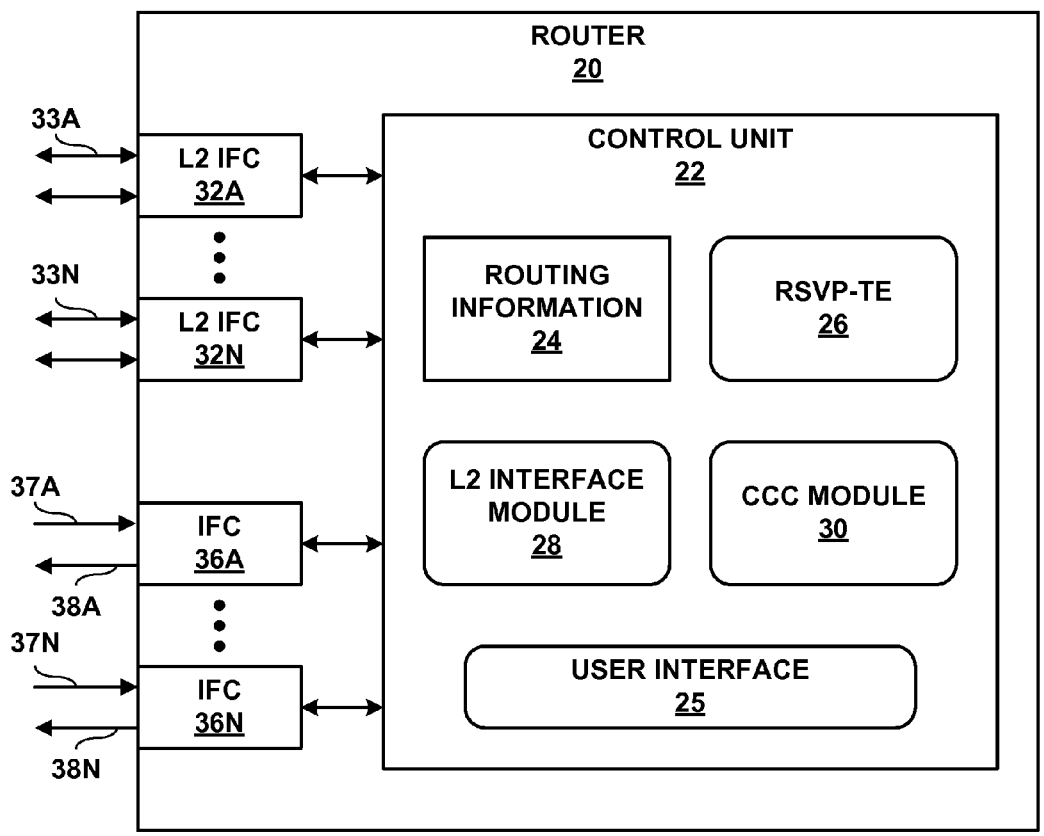
FIG. 2 is a block diagram illustrating an exemplary router that enables L2 multicast traffic to be transmitted across an MPLS network as described herein.

FIG. 2 is a block diagram illustrating an exemplary router 20 that enables L2 multicast traffic to be transmitted across an MPLS network consistent with the principles of the invention. For example, router 20 may be an ingress router (i.e., a source network device) of a P2MP LSP established across an MPLS network. Router 20 may also be one of multiple egress routers (i.e., destination network devices) of the P2MP LSP. Router 20 may operate substantially similar to SE router 12 or one of RE routers 16 within MPLS network 8 from FIG. 1.

In the illustrated embodiment, router 20 includes a set of interface cards (IFCs) 36A-36N ("IFCs 36") for communicating packets between router 20 and an MPLS network via inbound links 37A-37N ("inbound links 37") and outbound links 38A-38N ("outbound links 38"). IFCs 37 are typically coupled to links 37 and 38 via one or more interface ports. Furthermore, router 20 includes a set of L2 IFCs 32A-32N ("L2 IFCs 32") for communicating frames between router 20 and L2 networks via L2 interfaces 33A-33N ("L2 interfaces 33"). For example, at least one of L2 IFCs 32 may be an ATM interface card for communicating ATM frames (or cells) via virtual circuits 33.

Router 20 further comprises a control unit 22 that includes an L2 interface module 28. L2 interface module 28 maintains a record of L2 interfaces 33 on which router 20 receives L2 traffic via L2 IFCs 32. In some cases, L2 interfaces 33 may carry multicast group join requests from router 20 to a L2 multicast source network. L2 interfaces 33 may then, in turn, carry L2 multicast traffic associated with the requested multicast groups. L2 interface module 28 may map each of L2 interfaces 33 to a specific multicast group Control unit 22 also maintains routing information 24. Routing information 24 describes the topology of a network and, in particular, routes through the network. Routing information 24 may include, for example, route data that describes various routes within the network, and corresponding next hop data indicating appropriate neighboring devices within the network for each of the routes. Router 20 updates routing information 24 to accurately reflect the topology of the network. In general, when router 20 receives a packet via one of inbound links 37, control unit 22 determines a destination and associated next hop for the packet in accordance with routing information 24 and outputs the packet on one of outbound links 38 based on the destination.

In the example of FIG. 2, control unit 22 provides an operating environment for a resource reservation protocol with traffic engineering 26 ("RSVP-TE 26") to execute within control unit 22. In other embodiments, other protocols may be executed within control unit 22, such as the label distribution protocol (LDP). RSVP-TE 26 receives resource reservation requests from other routing devices, and reserves the requested bandwidth on outbound links 38 for RSVP-TE traffic. In the event traffic needs to be rerouted around a network failure or a congested link, for example, a system administrator or software agent invokes RSVP-TE 26 to traffic engineer a new path through the network and establish the LSP. Although described for exemplary purposes in reference to RSVP-TE, the principles described herein may by applied to extend other protocols, such as different constraint-based routing protocols.

RSVP-TE 26 provides signaling mechanisms for establishing individual branch LSPs and merging the branch LSPs to form a P2MP LSP within an MPLS network. In this way, RSVP-TE 26 may establish a P2MP LSP from a SE router to multiple RE routers substantially similar to P2MP LSP 15 from FIG. 1. The route data associated with the P2MP LSP is added to routing information 24 in order to accurately reflect the topology of the MPLS network.

CCC module 30 establishes and configures logical CCC switches to cross-connect one or more of L2 interfaces 33 to a P2MP LSP established by RSVP-TE 26. CCC module 30 may configure the CCC switches based on configuration information provided by a user. For example, a user may specify the configuration information for router 20 via a user interface 25 included within control unit 22. User interface 25 may include a display, a keyboard, a mouse or any other type of input device. CCC module 30 may also communicate with L2 interface module 28 to determine which one of L2 interfaces 33 is mapped to a specific multicast group. CCC module 30 cross-connects L2 interfaces 33 to network links 37, 38 associated with P2MP LSPs to enable L2 multicast traffic to be transmitted across the MPLS network.

In the case where router 20 comprises an ingress router of the P2MP LSP, CCC module 30 configures a CCC switch that logically cross-connects the one of L2 interfaces 33 on which router 20 receives L2 multicast traffic from a source network to the transmitting P2MP LSP. The CCC switch is capable of mapping the L2 multicast traffic received on the one of L2 interfaces 33 to a specific one of outgoing links 38 associated with the P2MP LSP. CCC module 30 may receive configuration information from user interface 25 that includes a name for the ingress CCC switch (p2 mp_transmit_switch [name]), the name of the ingress L2 interface (input_interface [name]), and the name of the transmitting P2MP LSP (transmit_p2 mp_lsp [name]).

Upon receiving the L2 multicast traffic from the source network on the specific one of L2 interfaces 33 via L2 IFCs 32, control unit 22 sends the L2 multicast traffic to CCC module 30. CCC module 30 encapsulates the L2 multicast traffic in a MPLS packet regardless of the type of payload the L2 multicast traffic is carrying. CCC module 30 then forwards the MPLS packet onto the P2MP LSP according to the CCC switch. More specifically, control unit 22 forwards the MPLS packet on the one of outgoing links 38 associated with the P2MP LSP via IFCs 36.

In the case where the P2MP LSP branches to multiple transit routers from the ingress router, as shown in FIG. 1, the CCC switch is capable of mapping the L2 multicast traffic to two or more of outgoing links 38 associated with the P2MP LSP. Therefore, router 20 encapsulates the L2 multicast traffic received on the appropriate one of L2 interfaces 33 via L2 IFCs 32 in a MPLS packet, replicates the MPLS packet, and forwards one copy of the MPLS packet on each of the associated outgoing links 38 via IFCs 36.

In the case when router 20 comprises one of the multiple egress routers of the P2MP LSP, CCC module 30 configures a CCC switch that cross-connects a leaf of the receiving P2MP LSP to one of L2 interfaces 33 coupled to a customer network that includes subscriber devices requesting the L2 multicast traffic. The CCC switch is capable of mapping MPLS packets received on the one of incoming links 37 associated with the P2MP LSP to a specific one of L2 interfaces 33. In this case, CCC module 30 may receive configuration information from user interface 25 that includes a name for the egress CCC switch (p2 mp_receive_switch [name]), the name of the egress L2 interface (output_interface [name]), and the name of the receiving P2MP LSP (transmit_p2 mp_lsp [name]).

Upon receiving the MPLS packet from the P2MP LSP on the one of incoming links 37 via IFCs 36, control unit 22 sends the MPLS packet to CCC module 30. CCC module 30 retrieves the L2 multicast traffic from the MPLS packet. CCC module 30 then forwards the L2 multicast traffic onto one of L2 interfaces 33 according to the CCC switch. More specifically, control unit 22 forwards the L2 multicast traffic to a customer network on a specific one of L2 interfaces 33 via L2 IFCs 32.

In the case where more than one customer network is coupled to the egress routers of the P2MP LSP, as shown in FIG. 1, the CCC switch may map the MPLS packet from the P2MP LSP to two or more of L2 interfaces 33. Router 20 retrieves the L2 multicast traffic from the MPLS packet received on one of incoming links 37 via IFCs 36, replicates the L2 multicast traffic, and forwards one copy of the L2 multicast traffic on each of the L2 interfaces 33 via L2 IFCs 32.

The architecture of router 20 illustrated in FIG. 2 is shown for exemplary purposes only. The invention is not limited to this architecture. In other embodiments, router 20 may be configured in a variety of ways. In one embodiment, for example, some of the functionally of control unit 22 may be distributed within IFCs 36 or L2 IFCs 32. In another embodiment, control unit 22 may include a routing engine that performs routing functions and maintains a routing information base (RIB), e.g., routing information 24, and a forwarding engine that performs packet forwarding based on a forwarding information base (FIB) generated in accordance with the RIB.

Control unit 22 may be implemented solely in software, or hardware, or may be implemented as a combination of software, hardware, or firmware. For example, control unit 22 may include one or more processors which execute software instructions. In that case, the various software modules of control unit 22, such as RSVP-TE 26, may comprise executable instructions stored on a computer-readable medium, such as computer memory or hard disk.

Figure 3:
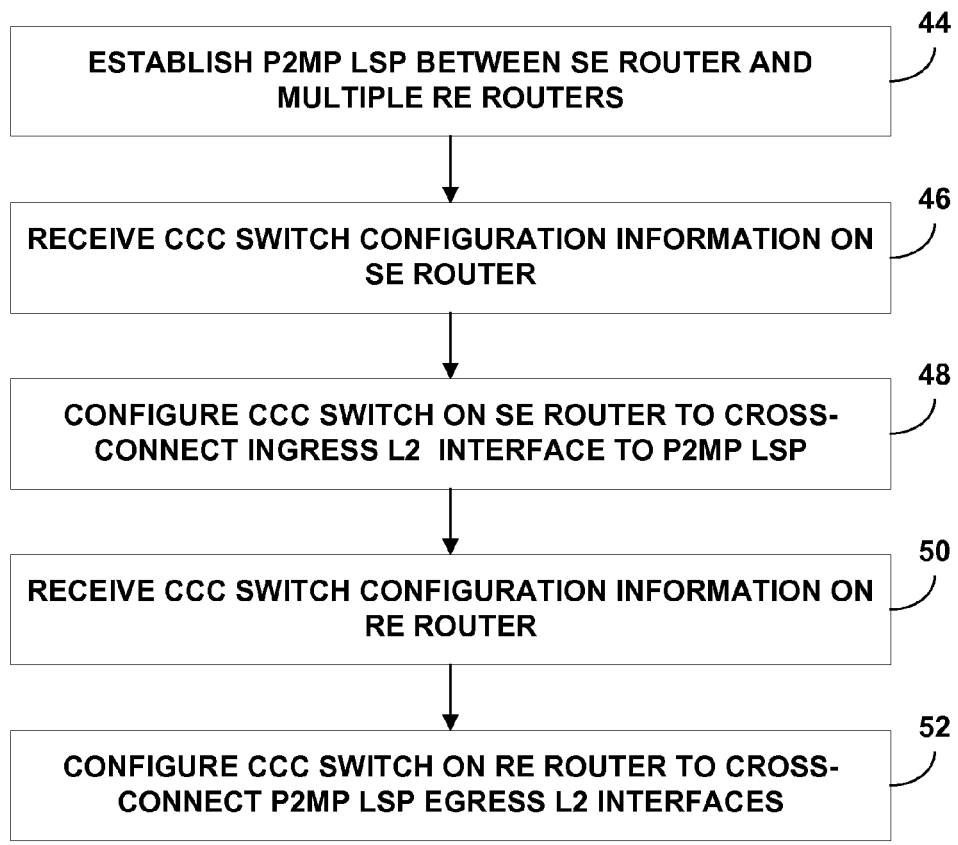
FIG. 3 is a flow chart illustrating an exemplary process of configuring network devices within an MPLS network to transmit L2 multicast traffic across the MPLS network.

FIG. 3 is a flow chart illustrating an exemplary process of configuring network devices within an MPLS network to transmit L2 multicast traffic across the MPLS network. The network devices may comprise either a SE router (i.e., a source network device) of a P2MP LSP or one of multiple RE routers (i.e., receiver network devices) of the P2MP LSP. The network devices may be substantially similar to router 20 illustrated in FIG. 2.

Each of the network devices includes a signaling protocol that establishes the P2MP LSP between the SE router and the multiple RE routers (44). For example, the signaling protocol may comprise RSVP-TE. RSVP-TE may be used to set up several branch LSPs between the SE router and each of the RE routers separately. RSVP-TE then merges the branch LSPs into a single P2MP LSP. The route data of the P2MP LSP is then added to routing information included within the network devices in order to accurately reflect the topology of the MPLS network.

The SE router of the P2MP LSP receives ingress CCC switch configuration information from a user via a user interface or via a software agent (46). A CCC module within the SE router uses the configuration information to configure a CCC switch that cross-connects an ingress L2 interface to the P2MP LSP (48). The configuration information may include a name for the ingress CCC switch and names of the ingress L2 interface and the transmitting P2MP LSP to be cross-connected.

Each of the multiple RE routers of the P2MP LSP receives egress CCC switch configuration information from a user via a user interface or from an automated software agent (50). A CCC module within each of the RE routers uses the configuration information to configure a CCC switch that cross-connects the P2MP LSP to at least one egress L2 interface (52). The configuration information may include a name for the egress CCC switch and names of the receiving P2MP LSP and the egress L2 interfaces to be cross-connected.

Figure 4:
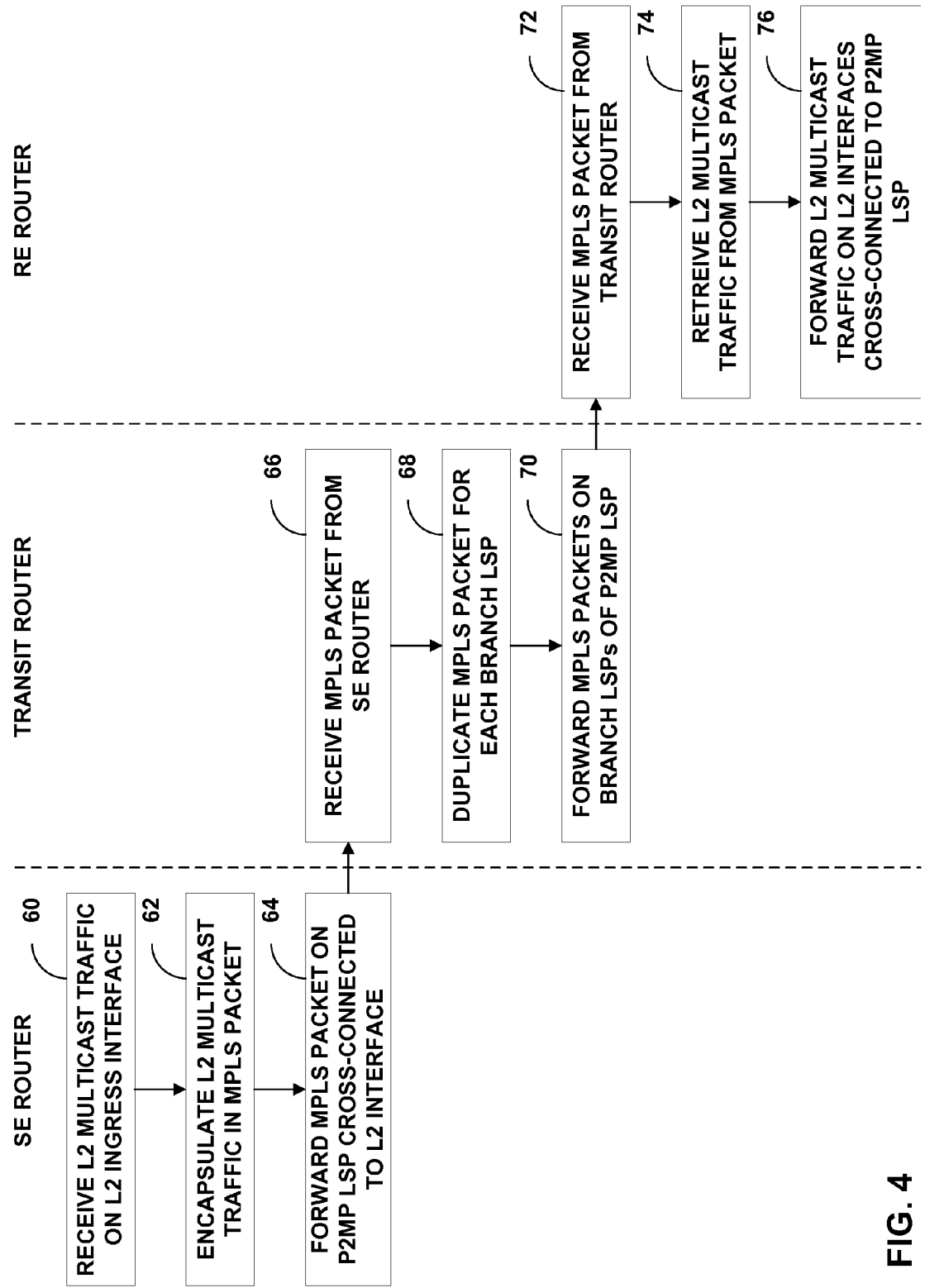
FIG. 4 is a flowchart illustrating an exemplary process of transmitting L2 multicast traffic across an MPLS network.

FIG. 4 is a flowchart illustrating an exemplary process of transmitting L2 multicast traffic across an MPLS network. For exemplary purposes, the process is described relative to MPLS network 8 illustrated in FIG. 1. MPLS network 8 includes P2MP LSP 15 from SE router 12 to multiple RE routers 16. L2 multicast source network 10 couples to SE router 12 via L2 interface 11. Customer networks 18 couple to RE routers 16 via L2 interfaces 17. Each of customer networks 18 may include a plurality of subscriber devices. CCC switches are configured within SE router 12 and each of RE routers 16 to cross-connect the L2 interfaces to P2MP LSP 15.

SE router 12 receives L2 multicast traffic from source network 10 on L2 interface 11 (60). A CCC switch within SE router 12 encapsulates the L2 multicast traffic into a MPLS packet (62) by pre-pending a MPLS header to the set of frames. SE router 12 then forwards the MPLS packet according to the CCC switch. Specifically, SE router 12 forwards the MPLS packet on P2MP LSP 15 which is cross-connected to L2 interface 11 via the CCC switch (64). SE router 12 pushes a forwarding label onto the MPLS packet that identifies the next hop along P2MP LSP 15.

The MPLS packet is transmitted to one of transit routers 14A and 14B based on the label affixed to the MPLS packet. Transit router 14B, for example, receives the MPLS packet from SE router 12 (66). Transit router 14B may forward the MPLS packet without regard to the L2 multicast content encapsulated within the packet. In this manner, router 14B need not disassemble the MPLS packet to retrieve the L2 multicast data.

In the embodiment illustrated in FIG. 1, branch LSPs 15B and 15C of P2MP LSP 15 separate at transit router 14B. Therefore, transit router 14B determines whether both RE router 16B and RE router 16C requested the multicast traffic encapsulated in the MPLS packet. If both RE routers 16B and 16C requested the multicast traffic, transit router 14 duplicates the MPLS packet for each branch LSP (68).

Transit router 14B then forwards a copy of the MPLS packet on each of branch LSPs 15B and 15C of P2MP LSP 15 (70). Transit router 14B pushes a forwarding label onto the first copy of the MPLS packet that identifies the next hop along branch LSP 15B. Transit router 14B also pushes a forwarding label onto the second copy of the MPLS packet that identifies the next hop along branch LSP 15C. In the embodiments described herein, RSVP-TE may establish P2MP LSP 15 with penultimate hop popping turned off such that each RE router 16 advertises a non-null label.

The MPLS packets are transmitted to RE routers 16B and 16C based on the labels affixed to the MPLS packets. RE router 16C, for example, receives one of the MPLS packets from transit router 14B (72). RE router 16C disassembles the MPLS packet and retrieves the L2 multicast traffic encapsulated in the MPLS packet (74). In the embodiment illustrated in FIG. 1, both customer networks 18C and 18D are coupled to RE router 16C. Therefore, RE router 16C determines whether both customer network 18C and customer network 18D include subscriber device that requested the multicast traffic. If both customer networks 18C and 18D requested the multicast traffic, RE router 16C duplicates the L2 multicast traffic for each customer network.

RE router 16C then forwards the identical copies of the L2 multicast traffic according to the CCC switch configured within RE router 16C by forwarding the L2 multicast traffic on L2 interfaces 17C and 17D which are cross-connected to P2MP LSP 15 (76). Customer networks 18C and 18D are then responsible for transmitting the L2 multicast traffic from the L2 interfaces to each requesting subscriber device within the customer networks.

The above description constitutes one exemplary embodiment whereby a source device, such as router 12 of FIG. 1, may establish a P2MP LSP, such as P2MP LSP 15, that connects the source device to multiple receiver devices, such as RE routers 16. As described above, the source device may couple one, or even two or more, ingress L2 interfaces to the P2MP LSP in order to facilitate the transmission of multicast traffic originated from a source network, such as source network 10, to remote customer networks, such as customer networks 18.

While described above with respect to connecting a particular type of interface, e.g., L2 interfaces, the techniques may include other types of so-called "attachment circuits." An attachment circuit or AC may include both virtual and physical circuits, as identified by one or more of a Frame Relay Data Link Connection Identifier (DLCI), an Asynchronous Transfer Mode (ATM) protocol Virtual Path Identifier/Virtual Circuit Identifier (VPI/VCI), an Ethernet port number, a Virtual Large Area Network (VLAN) identifier, a Point-to-Point Protocol (PPP) session from an L2 Tunneling Protocol (L2TP), and an MPLS LSP. The techniques therefore may be generally described below with respect to the more general attachment circuit rather than a particular L2 interface.

Moreover, while described above with respect to configuring a particular CCC module, the techniques may be applied to any module capable of establishing a P2MP LSP and connecting one or more L2 interfaces or, more generally, attachment circuits to the P2MP LSP. In this respect, the discussion above with regard to a CCC module may represent one example of configuring a source device to connect one, or even two or more, attachment circuits to the same P2MP LSP. As described in more detail with respect to the following figures, the techniques for connecting two or more attachment circuits to the same P2MP LSP may facilitate delivery of L2 or even L1 services via a L3 packet-switched network from a source network to multiple remote customer networks.

Figure 5:
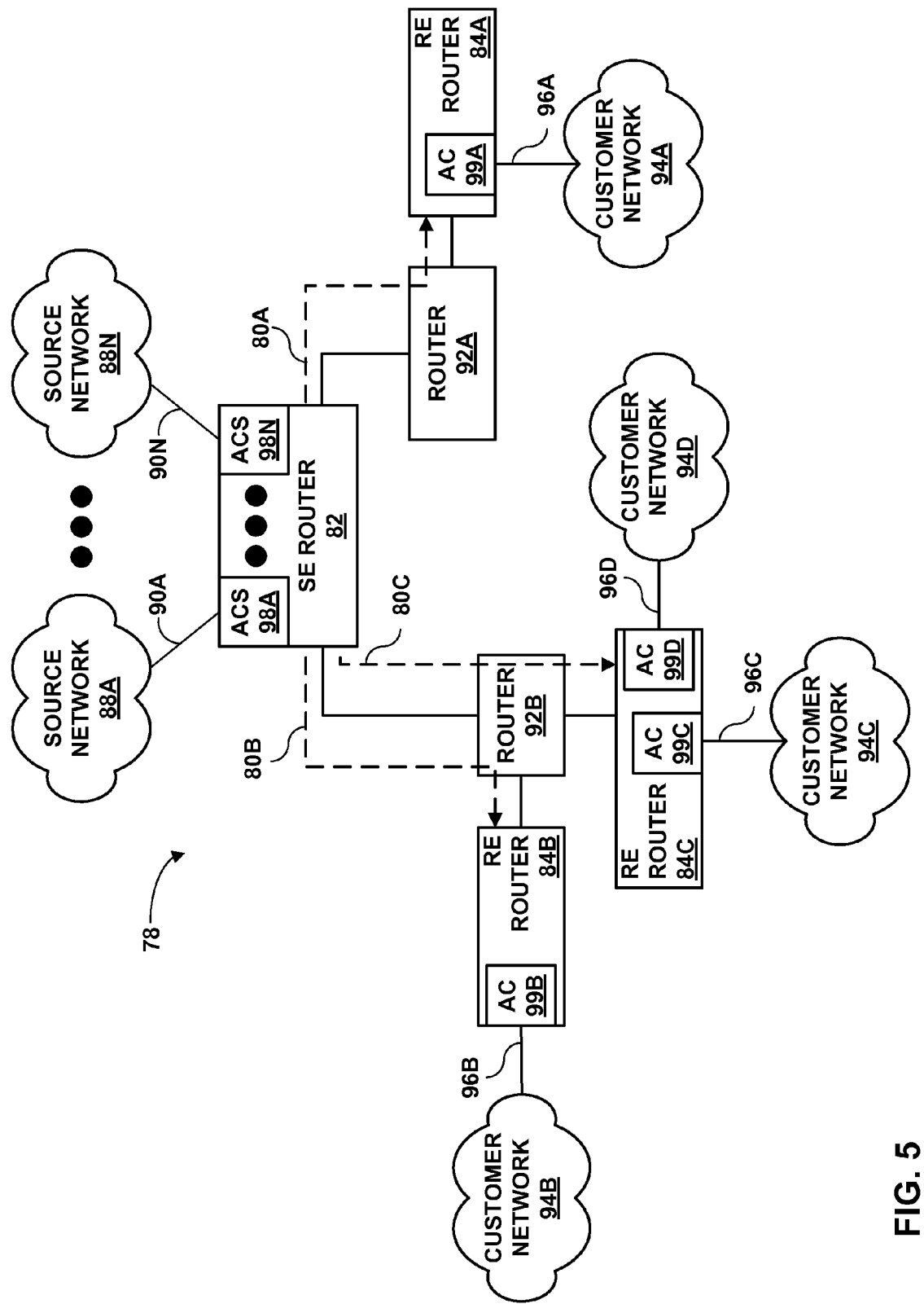
FIG. 5 is a block diagram illustrating an exemplary computer system in which Layer 2 (L2) traffic is transmitted across a Multi-protocol Label Switching (MPLS) network in accordance with the principles of the invention.

FIG. 5 is a block diagram illustrating an exemplary computer system in which Layer 2 (L2) traffic is transmitted across a Multi-protocol Label Switching (MPLS) network 78 in accordance with the principles of the invention. In this example, MPLS network 78 includes a P2MP LSP 80 established between a SE router 82 and multiple RE routers 84A-84C ("RE routers 84") similar to P2MP LSP 15 of FIG. 1. Further, SE router 82 may auto-discover those network devices within MPLS network 78, e.g., RE routers 84, that comprise endpoints for a particular P2MP LSP, such as P2MP LSP 80, and dynamically configure the P2MP LSP 80 without requiring any administrator or other user input or interaction. Once established, SE router 82 may employ P2MP LSP 80 to carry multiple PsuedoWires (PWs), which in effect enables coupling one or a plurality of different L2 interfaces (or more generally attachment circuits) to the same P2MP LSP. As a result, SE router 82 may facilitate delivery of multiple services in the form of multiple PWs over the same P2MP LSP 80 to reduce network overhead (e.g., amount of state information to route data within network 78).

In the example of FIG. 5, MPLS network 78 includes a plurality of source networks 88A-88N ("source networks 88"), each of which couples to SE router 82 via one or more links 90A-90N ("links 90"). Each of source networks 88 may be substantially similar to source network 10 described above with respect to FIG. 1. SE router couples to transit or intermediate routers 92A, 92B ("routers 92"). These routers 92 may each be intermediate or transit in that these routers 92 are positioned between or lie intermediate to SE router 82 and RE routers 84 and provide transit services for P2MP LSP 80. Routers 92 may be substantially similar to routers 14 of FIG. 1. RE routers 84 couple to transit routers 92. RE routers 84 may be similar to RE routers 16 of FIG. 1 in that each of RE routers 84 couples to one or more customer networks 94A-94D ("customer networks 94") via a corresponding one of links 96A-96D ("links 96"). Customer networks 94 may be substantially similar to customer networks 18 of FIG. 1.

Links 90 and 96 may interface respectively with SE router 82 and RE routers 84 via a physical interface, such as the above described L2 interfaces. While described herein with respect to L2 interfaces, the techniques may apply to any L2 or lower layer interfaces, including a Layer 1 (L1) or physical layer interface. In this sense, each of links 90 and 96 may represent a physical communication medium coupled to a physical L2 interface, which may be substantially similar to the L2 interfaces described above.

In accordance with the techniques described herein, SE router 82 establishes P2MP LSP 80 within MPLS network 78. Over P2MP LSP 80, SE router 82 may emulate one or more L2 services, L1 services or any other service at or below L2 to provide a P2MP telecommunication service. To emulate these so called "native services," such as ATM or Ethernet services, over a packet switched network (PSN), SE router 82 may establish one or more P2MP Pseudo Wires (PWs) over P2MP LSP 80.

A P2MP PW is a mechanism that emulates attributes of a unidirectional P2MP telecommunication service, such as P2MP ATM, over a packet PSN, such as MPLS network 78. A P2MP PW may emulate a unidirectional P2MP telecommunication service by encapsulating service-specific Protocol-Data Units (PDUs) within an MPLS packet and transmitting the encapsulated PDU across MPLS network 78 via a P2MP LSP, such as P2MP LSP 80, or any other tunnel to one or more customer networks 94. To emulate the native L2 service that transports the L2 data units, such as ATM, frame relay or Ethernet, the P2MP PW mechanism may manage both the timing and order of transmitting the PDUs and any other operations required to accurately emulate behavior and characteristics of the native service. Further information regarding P2MP PWs and signaling P2MP PWs can be found in an Internet Draft, titled "Point-to-Multipoint Pseudowire Signaling and Auto-Discovery in Layer 2 Virtual Private Networks," R. Aggarwal, dated November 2007, herein incorporated by reference.

Often, a service provider that maintains and operates MPLS network 78 may offer this PW emulation as a service to customers. The service provider may characterize the service as a L2 Multicast Virtual Private Network Service or Virtual Private Multicast Service (VPMS). A VPMS "customer" may therefore comprise a customer having a plurality of separate sites or independent networks that requires P2MP connectivity between the various sites or networks of the customer. In the example shown in FIG. 5, the customer may maintain and operate each of source networks 82 and customer networks 94, while the service provider maintains MPLS network 78. A L2 VPN that offers VPMS may also be referred to as an "L2 Multicast VPN" or L2 MVPN. This PW service may enable L2 P2MP connectivity through MPLS network 78 such that the customer may maintain privacy of communication and address space despite operating within a possibly public PSN, such as MPLS network 78.

Each of the customer operated networks, including source network 88 and customer networks 94, may comprise at least one network device that couples to SE routers 82 and RE routers 84. This network device may be referred to as a "customer edge" or CE device, such as a CE router or switch, as each lies at the edge of the customer networks. For ease of illustration purposes, the CE devices are not shown within FIG. 5. Each of the CE devices may be assigned one or more CE identifiers ("CE IDs") that uniquely identifies a CE device within an L2 MVPN. In some instances, each CE device may be assigned a unique CE ID that identifies a physical connection, e.g., links 90 and 96, from the CE device to a provider edge (PE) device, such as SE router 82 and RE routers 84. Thus, in instances where the CE device couples to multiple PE devices and/or in instances where the CE couples via multiple physical links to the same PE device, the CE ID may serve to differentiate each physical connection. Within each physical connection between a CE device and a PE device, there may be multiple Attachment Circuits (ACs).

An AC, as described above, may comprise either a physical or a virtual layer two (L2) circuit for receiving L2 data units from a physical communication medium. An AC may comprise either a physical or virtual circuit identified, for example, by one of a Frame Relay Data Link Connection Identifier (DLCI), an Asynchronous Transfer Mode (ATM) protocol Virtual Path Identifier/Virtual Circuit Identifier (VPI/VCI), an Ethernet port number (which is an example of a L2 interface), a Virtual Large Area Network (VLAN) identifier, a Point-to-Point Protocol (PPP) session from an L2 Tunneling Protocol (L2TP), and an MPLS LSP. Thus, multiple virtual circuits may execute within a single physical circuit or connection, each of which provides a different virtual circuit or connection between the same CE device and PE device.

Each P2MP connection emulated through intermediate network 28 by a P2MP PW is rooted in a single CE device, referred to as a "root CE device," that provide L2 traffic in the form of L2 data units. The P2MP PW connects the root CE device to one or more other CE devices, referred to as "leaf CE devices," of other customer networks. In the instance of FIG. 5, source networks 88 may each comprise a root CE device (i.e., a source CE device that provides L2 traffic from the source networks, hence the name "source network") that is coupled to one or more leaf CE devices included within each of customer networks 94 via a corresponding P2MP PW. A separate P2MP PW signaled through intermediate network 78 is used for each ingress AC of SE router 82 and may emulate the connectivity between each root or source CE device and the leaf CE devices over a PSN, such as MPLS network 78. Moreover, as explained in further detail below, as ingress to P2MP LSP 80, se router 82 may bundle multiple P2MP PWs in that the P2MP PWs for different ingress ACs of SE router 82 can be connected to the single P2MP LSP 80, thereby allowing L2 data units received from the different ACs to traverse the same P2MP LSP through intermediate network 78.

To ensure accurate emulation of the native L2 or lower-layer service on a layer three (L3) typically Internet Protocol (IP) packet switched or packet-based network, such as MPLS network 78, SE router 82 and RE routers 84 are configured to conform to certain principles set forth herein. For example, SE router 82 and RE routers 84 may be configured to allow, for each P2MP PW, a root CE device in a sender site, e.g., one of source networks 88, sends VPMS traffic via links coupled to any of a plurality of ACs of the root PE device, e.g., SE router 82 that operates as an ingress to the P2MP LSP. Accordingly, SE router 82, as shown in FIG. 5, includes one or more ingress ACs 98A-98N ("ACs 98") for each physical connection or one of links 90 coupling source networks 88 to SE router 82. However, SE router 82 and RE routers 84 may require that, for each P2MP PW, each leaf PE device, e.g., RE routers 84, deliver this VPMS traffic via only a single AC to one or more leaf CE device in a receiver site, e.g., customer networks 94. That is, each leaf CE device receives L2 traffic for a P2MP PW from the leaf PE via a single AC. As a result, each of RE routers 84 include a separate egress ACs 99A-99D ("ACs 99") that couples a respective one of RE routers 94 to each leaf CE device of respective customer networks 94, and each of the P2MP PWs serviced by the leave PE is connected to a separate egress ACs.

While each leaf CE device may receive L2 traffic for a particular P2MP PW via a single AC, a particular leaf CE device may receive traffic from multiple sender or root CE devices. However, when receiving traffic from multiple sender or root CE devices, the leaf CE device typically receives the traffic from each of the different sender or source CE devices via a separate or unique AC, thereby allowing intermediate network 78 to manage the PWs in a manner that more accurately emulates a dedicated wired connection (hence the name "psuedowire") or circuit between the root CE and the leaf CEs. The leaf PE device, e.g., RE routers 84, may determine the egress AC to use for different traffic from different sender or root/source CE devices based on a root or source CE ID assigned to one of the physical connections or links 90 coupling a root CE device to SE router 82. For example, RE router 84A may configure AC 99A with the root CE ID that identifies the connection between the root CE device of source network 88A and SE router 82. This root CE ID may, in this respect, identify the root CE ID from which RE router 84A receives VPMS traffic. In some instances, RE router 84A may configure AC 99A according to an algorithmic mapping between the root CE ID and the leaf AC 89A.

To establish the P2MP PW, SE router 82 and RE routers 84, or more generally, the PE devices, may establish a tunnel through MPLS network 78, such as P2MP LSP 80. The L2 MVPN may require the tunnel to support the P2MP PW. Establishing P2MP LSP 80 may occur in the manner described above, or alternatively via an auto-discovery procedure. More information concerning auto-discovery for multicast in VPLS can be found in an Internet Draft, titled "Multicast in VPLS," R. Aggarwal et. al., dated Nov. 17, 2007, herein incorporated by reference.

Briefly, auto-discovery within the context of the techniques described herein may be implemented by the PE routers, e.g., SE router 82 and RE routers 84, to advertise PE to CE attachments or associations. For example, SE router 82 may advertise an association between a CE device of source network 88A that couples to SE router 82 via link 90A to each of RE routers 84. Typically, each PE device performs auto-discovery using a Border Gateway Protocol (BGP) such that each PE device learns VPLS memberships of other PE devices. For example, SE router 82 may announce a VPLS membership using a BGP message referred to as a Network Layer Reachability Information (NLRI) message that identifies a Route Distinguisher (RD) and the local CE ID. Based on these CE-PE mappings or bindings, each PE device can learn of memberships to a particular VPLS or in this case MVPN.

After establishing the memberships to each MVPN, SE router 82 may establish P2MP LSP 80 in the manner described above, e.g., by establishing branch LSPs 80A-80C between the source and other members of the VPLS and merging these branch LSPs 80A-80C to form P2MP LSP 80.

After performing auto-discovery and establishing P2MP LSP 80, SE router 82 may perform upstream signaling to signal P2MP PWs to leaf PE devices, such as RE routers 84. As P2MP LSP 80 represents a unidirectional flow of traffic, reference to "upstream" and "downstream" refer to the order of devices with respect to transmitting traffic for a given unidirectional flow of traffic. As such, SE router 82 may represent a network device upstream from RE routers 84 as SE router 82 is farther up from the stream or flow of traffic and closer to the source. "Upstream" signaling may therefore refer to signaling by upstream devices, such as SE router 82, to a downstream device, such as RE routers 84. Typically, to establish an LSP, downstream devices perform signaling or "downstream signaling" to signal labels to use to reach a given destination. Additional information concerning upstream label assignment or signaling can be found in an Internet Draft, titled "MPLS Upstream Label Assignment and Context Specific Label Space," R. Aggarwal et. al., dated February 2006, herein incorporated by reference.

However, in some instances, such as multicast in VPLS as described in the above incorporated reference, an upstream device, such as SE router 82, may perform upstream signaling to control the delivery of particular types of traffic. With respect to the techniques described herein, SE router 82 may perform upstream signaling to signal an MPLS label to use for a given P2MP PW. SE router 82 may distribute labels upstream because traffic belonging to different P2MP PWs, which may belong to different L2 MVPNs, may be carried over the same P2MP PSN tunnel, e.g., P2MP LSP 80. In other words, a single P2MP LSP 80 may be employed as a transit path for (or, in other words, to carry) multiple P2MP PWs. As each PE router maintains its own independent label space, each PE router typically assigns a random label downstream for use in reaching a given destination. However, in multicast networks, such random assignment may lead to confusion as the same label may be assigned to reach two destinations within a given MVPN. Routers upstream may then be unable to resolve the path as two destinations may comprise the same label. In the context of multiple P2MP PWs, a similar confusion may arise where multiple PE routers assign the same label to different P2MP PWs, thereby inadvertently enabling some CE devices (and their corresponding one of customer networks 94) access to a P2MP PW possibly established for a different L2 MVPN.

To avoid this confusion, SE router 82 may establish P2MP LSP 80 to carry traffic for each of source networks 88. To carry this traffic and emulate the native service used by source networks 80, SE router 82 may establish a P2MP PW over the P2MP LSP 80 by distributing an MPLS label to use for a given P2MP PW upstream to RE routers 84. This MPLS label may be referred to as an upstream assigned label or upstream assigned MPLS label. As a central source distributes these upstream assigned MPLS labels for the P2MP PWs, SE router 82 may ensure that overlapping of MPLS labels does not occur, thereby avoiding inadvertent path confusion that may occur if only downstream signaling is used.

SE router 82 may distribute an upstream assigned MPLS label to each of RE routers 84 via a message or other distribution communication that maps the P2MP LSP label to an P2MP PW label. This mapping data defining the mapping between the P2MP LSP label and the P2MP PW label may identify a label space associated with a particular P2MP LSP and each of RE routers 84 may store data that defines this label space. In some instances, RE routers 84 may belong to multiple or a plurality of P2MP LSP and therefore may maintain multiple P2MP LSP label spaces assigned by upstream devices. In this respect, the P2MP LSP label may define a context in which to select the appropriate one of the plurality of label spaces and may be referred to as a "context label."

Moreover, the upstream assigned MPLS labels may represent a "P2MP PW demultiplexor" in that the downstream PE devices, such as RE devices 84 may utilize the upstream assigned MPLS PW label to demultiplex multiple P2MP PWs received via a single P2MP LSP 80. In operation, SE router 80 may maintain an association between one or more of ACS 98 and an upstream assigned PW label, as well as, an association between a label and a Forwarding Equivalence Class (FEC). A FEC may identify a set of packets that a single router forwards to the same next hop out of the same interface with the same treatment. SE router 82 may determine the association between a FEC and a label when establishing P2MP LSP 80. In other words, SE router 82 may establish the association between the label and the FEC when resolving topology information to determine P2MP LSP 80.

In any event, SE router 82 may then receive traffic from one or more of source networks 88 via one or more of ACs 98. As described above, each of ACs 98 represent one or more ACs for each physical connection or one of links 90. SE router 82, depending on which of the one of ACs 98 the traffic arrives, may assign one or more labels to the network traffic. Particularly, SE router 82 may determine to which FEC a data unit, e.g., a cell or frame of the traffic, belongs and append a first label to the data unit, where the first label identifies the path, e.g., P2MP LSP 80. SE router 82 may then determine on which of ACs 98 the data unit arrive and append a second label to the data unit, where the second label identifies the P2MP PW to which the data unit corresponds. Often the first label resides on top of the second label in the label stack and may be referred to as the "outer label," while the second label may be referred to as the "inner label." Typically, only the ingress PE device, e.g., SE router 82, and the egress PE devices, e.g., RE routers 84, recognize, are aware of, or otherwise understand the inner label. In this respect, the P2MP PWs may be transparent to transit routers 92 as these routers are not aware of the labels associated with P2MP PWs nor act on these PW labels by swapping, removing or appending these PW labels to MPLS packets.

RE routers 84 may each maintain, e.g., store and update, a mapping between between a downstream assigned labels and upstream assigned labels and a mapping between PW labels and respective ACs 99, which these RE routers 84 may utilize to determine to which customer network 94 the data unit is destined. Upon receiving the data unit, one of RE routers 84 may first remove the outer label identifying P2MP LSP 80, as each of RE routers 84 terminate a branch of P2MP LSP 80. This one of RE routers 84 may then utilize the outer label to identify a context in which to understand the inner label. That is, the one or RE routers 84 may select an appropriate one of the plurality of label spaces assigned by an upstream device, e.g., SE router 82, based on the mapping between downstream assigned labels and upstream assigned labels. This located label space may, in effect, represent a context specific label space of the ingress device or router, e.g., SE router 82. After locating this label space, the one of RE routers 84 may then pop or remove the inner label that identifies to which P2MP PW the data unit belongs, and, based on the mapping between PW labels and respective ACs 99, determine a corresponding one of respective ACs 99 on which to forward the data unit. The one of RE routers 84 may then forward the data unit via the determined one of respective ACs 99 to one of customer networks 94. The one of customer networks 94 may then route the data unit via the native service to the appropriate destination device included within the one of customer networks 94.

For example, one of RE routers 84 may receive an MPLS packet or other data unit defining a label stack that stores both the outer and inner labels. The outer label may represent the P2MP LSP label that identifies, as described above, a context in which to lookup the upstream assigned label stored below the outer label in the label stack. The upstream assigned label, again as described above, may represent an inner label that resides below the P2MP LSP outer label in the label stack. Based on this outer label, this one of egress routers 84 may identify one of the plurality of context specific label spaces that provides a context in which to understand the inner label. The one of RE routers 84 may then perform a lookup in the identified label space based on the inner label to determine on which of the respective one of ACs 99 to forward the MPLS payload.

Notably, for P2MP LSP 80, penultimate or next-to-last hop popping may need to be disabled within one or more of routers 82, 84 and 92 so as to avoid stripping or popping the outer label prior to the MPLS packet reaching egress routers 84. If penultimate hop popping (PHP) is not disabled, egress routers 84 may receive an MPLS packet that does not include the outer label. Without this outer label, egress routers 84 may be unable to perform the lookup in the appropriate context and therefore unable to forward this MPLS packet via a correct one or more of respective ACs 99.

In any event, a single source device of a computer network may, in this manner, establish a point to multi-point (P2MP) label switched path (LSP) that connects the source device to multiple receiver devices included within the computer network. The source device may then connect two or more ingress layer two (L2) and/or lower layer interfaces of the source device to the P2MP LSP. The source device, such as SE router 82, may utilize these techniques to, for example, connect multiple source networks 88 to a single P2MP LSP 80 rather than establish and maintain state information for separate P2MP LSPs 80 for each source network 88. SE router 82 may reduce overhead by instead establishing one or more, and in some instances a plurality of, P2MP PWs over P2MP LSP 80. For each P2MP PWs over P2MP LSP 80, SE router 82 and RE routers 84 may, as described above, map one or more ingress ACs 98 to an egress ACs 99 for each customer network 94 that belongs to a given MVPN. This particular mapping enables the emulation of native services over a PSN, such as MPLS network 78, as the mapping creates a virtual circuit over the LSP within the PSN that emulates the attributes and characteristics of the native service. As transit routers 92 are unaware of the inner PW label and therefore need not maintain PW labels, the techniques may reduce overhead (as the transit routers need only maintain the P2MP LSP label) while enabling accurate emulation of native services over a PSN, such as MPLS network 78, using a single P2MP LSP 80.

While shown in FIG. 5 as a single connection between a single one of source networks 88 and SE router 84, the techniques may also be utilized in instances where a single source network, e.g., a single CE device, interconnects with a source PE router, such as SE router 84, via multiple physical connections. In this instance, each of the multiple physical connections may represent a separate source network in that each of the separate connections may interconnect with SE router 82 via a separate L2 interface that may comprise one or more ACs 98. In other words, regardless of the external topology of source networks and the manner in which source networks interconnect to SE router 82, all aspects of the techniques, including the mappings between ACs 98 and P2MP PWs, remain the same. The techniques therefore should not be limited to the exemplary network topology depicted in FIG. 5.

Figure 6:
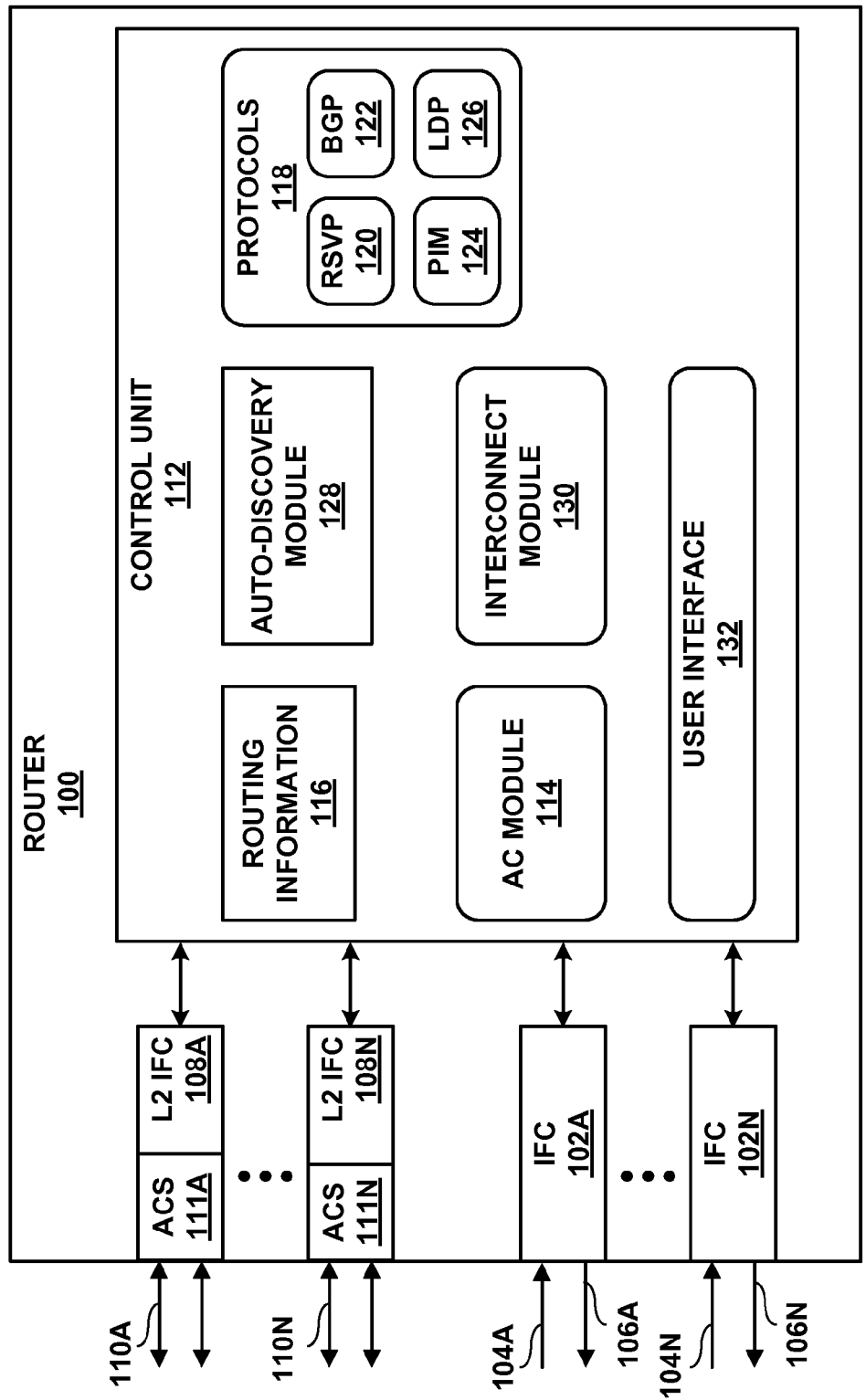
FIG. 6 is a block diagram illustrating an exemplary embodiment of a router that implements the techniques described herein to connect two or more interfaces to a single Point-to-Multi-Point (P2MP) Label Switched Path (LSP).

FIG. 6 is a block diagram illustrating an exemplary embodiment of a router 100 that implements the techniques described herein to connect two or more interfaces to a single P2MP LSP. For example, router 100 may be an ingress router (i.e., a source network device) of a P2MP LSP established across an MPLS network. Router 100 may also be one of multiple egress routers (i.e., destination network devices) of the P2MP LSP. Router 100 may operate substantially similar to SE router 82 or one of RE routers 84 within MPLS network 78 from FIG. 5.

In the illustrated embodiment, router 100, which may be similar to router 20 of FIG. 2, includes a set of interface cards (IFCs) 102A-102N ("IFCs 102") for communicating packets between router 100 and an MPLS network, such as MPLS network 78 of FIG. 5, via inbound links 104A-104N ("inbound links 104") and outbound links 106A-106N ("outbound links 106"). IFCs 102 are typically coupled to links 104 and 106 via one or more interface ports. Furthermore, router 100 includes a set of L2 IFCs 108A-108N ("L2 IFCs 108") for communicating frames or other L2 data units 110A-110N between router 100 and L2 networks, such as one o r more of source network 88 or one or more of customer networks 94, via one or more attachment circuits (ACS) 111A-111N ("ACs 111"). For example, at least one of L2 IFCs 108 may be an ATM interface card for communicating ATM frames (or cells) via a corresponding a virtual circuit 111. In this respect, ACs 111 may be similar to ACs 98 of an ingress or source network device (e.g., SE router 82) or ACs 99 of an egress or receiving network device (e.g., RE routers 84).

Router 100 further comprises unit 112 that includes an attachment circuit module 114 ("AC module 114"). AC module 114 maintains a record of ACs 111 on which router 100 recieves L2 traffic via L2 IFCs 108. In some cases, ACs 111 may carry multicast group join request from router 100 to L2 multicast source network. ACs 111 may then, in turn, carry L2 multicast traffic associated with the requested multicast groups. AC module 114 may map each of ACs 111 to a specific multicast group.

Control unit 112 also maintains routing information 116. Routing information 116 describes the topology of a network and, in particular, routes through the network. Routing information 116 may, as described above, include, for example, route data that describes various routes within the network, and corresponding next hop data indicating appropriate neighboring devices within the network for each of the routes. Control unit 112 updates routing information 116 to accurately reflect the topology of the network. In general, when router 100 receives a packet via one of inbound links 104, control unit 112 determines a destination and associated next hop for the packet in accordance with routing information 116 and outputs the packet on one of outbound links 106 based on the destination.

In the example of FIG. 6, control unit 112 provides an operating environment for a plurality of protocols 118. In the illustrated embodiment, protocols 118 include a Resource Reservation Protocol 120 ("RSVP 120"), a Border Gateway Protocol 122 ("BGP 122"), a Protocol Independent Multicast category of protocols 124 ("PIM 124"), an Internet Group Management Protocol 126 ("IGMP 126"), and a Label Distribution Protocol 128 ("LDP 128"). Control unit 112 also includes an auto-discovery module 128, an interconnect module 130 and a user interface 132.

RSVP 120 may represent a module that implements the RSVP protocol and in some instances RSVP with traffic engineering or "RSVP-TE. In some embodiments, rather than utilize RSVP 120, control unit 112 may execute LDP 126. RSVP 120 receives resource reservation requests from other routing devices, and reserves the requested bandwidth on outbound links 106 for RSVP traffic. In the event traffic needs to be rerouted around a network failure or a congested link, for example, a system administrator or software agent invokes RSVP 120 to traffic engineer a new path through the network and establish the LSP. Although described for exemplary purposes in reference to RSVP, the principles described herein may by applied to extend other protocols, such as different constraint-based routing protocols.

RSVP 120 provides signaling mechanisms for establishing individual branch LSPs and merging the branch LSPs to form a P2MP LSP within an MPLS network. In this way, RSVP 120 may establish a P2MP LSP from a SE router to multiple RE routers substantially similar to P2MP LSP 80 from FIG. 1. The route data associated with the P2MP LSP is added to routing information 24 in order to accurately reflect the topology of the MPLS network.

Auto-discovery module 128 represents a module that implements the above described auto-discovery procedure. Auto-discovery module 128 may advertise the VPLS multicast memberships of PE router, such as router 100, to other PE routers in the network using BGP 122 or another auto-discovery protocol. Auto-discovery module 128 may also receive VPLS advertisements from the other PE routers. Therefore, PE router 100 may have a complete view of the VPLS multicast memberships of the other PE routers in the network. Auto-discovery module 128 then determines which PE routers in the network belong to the same MVPN instances as PE router 100. In some cases, auto-discovery module 128 maintains PIM neighbor adjacencies with the PE routers of each of the MVPN instances as long as the BGP advertisement is not withdrawn in accordance with PIM 124. Auto-discovery module 128 may interact with RSVP 120 to automatically, without admin oversight or intervention, configure or establish the P2MP LSP within the MPLS network.

While not shown in FIG. 6, router 100 may implement a number of other modules required to perform auto-discovery. However, for ease of illustration purposes these other modules and not depicted in exacting detail, rather it is assumed that auto-discovery module incorporates these other modules. More information regarding auto-discovery, the other modules that may be used to perform auto-discovery and general information regarding the implementation of auto-discovery for VPLS services can be found in application Ser. No. 11/212,932, filed Aug. 26, 2005, entitled "Multicast Trees for Virtual Private Local Area Network (LAN) Service Multicast," by named inventor R. Aggarwal, the entire contents of which are hereby incorporated by reference as if fully set forth herein.

After establishing the P2MP LSP, control unit 112 may perform the above described upstream signaling to signal one or more P2MP PWs carried by the P2MP LSP using one or more of protocols 118, e.g., LDP 126. Interconnection module 130 may maintain a mapping or association between the signaled one or more P2MP PWs and the P2MP LSP over which the P2MP PWs are carried. Interconnection module 130 may receive configuration information indicating this P2MP PW to P2MP LSP associations via user interface 132. Alternatively, interconnection module 130 may automatically determine this mapping. Interconnection module 130 may then communicate with AC module 114 to determine which of L2 IFCs 108 include ACs 111 configured for P2MP PWs associated with the established P2MP LSP. Interconnection module 130 may then configure connections between two or more L2 IFCs 108 and IFCs 102 used to transmit traffic for the established P2MP LSP. These connections may be stored to a table with entries defining mappings between one or more of IFCs 108 (and associated ACs 111) and one of IFCs 102.

Upon receiving the L2 traffic from the source network on the specific one of ACs 111 via L2 IFCs 108, control unit 112 sends the L2 traffic to interconnection module 130. Interconnection module 130 may encapsulate the L2 traffic in a MPLS packet regardless of the type of payload the L2 traffic is carrying. More particularly, interconnection module 130 determines, based on the one of ACs 111 on which the L2 traffic arrives, inner and outer labels (or PW label and P2MP LSP label, respectively). Interconnection module 130 may maintain these labels within each entry of the above described table. Interconnection module 130 may perform a lookup on this table using the one of ACs 111 on which L2 traffic arrived as a key to retrieve an entry. Interconnection module 130 may then append the inner and outer labels specified by the retrieved entry in the label stack of the MPLS packet and forward the packet according to the outer label via the P2MP LSP. Specifically, control unit 112 forwards the MPLS packet via the one of outbound links 106 and corresponding one of IFCs 102 associated with the P2MP LSP. In this manner, router 100 may implement an interconnection module 130 to connect multiple (e.g., two or more) L2 IFCs 108 to a single P2MP LSP.

While described above with respect to an ingress network device, such as SE router 82, the techniques may apply to egress network devices as well. For example, AC module 114 may support mappings between ACs 111 and L2 IFCs 108 as described above. Interconnection module 130 may then communicate with AC module 114 to determine to which one of L2 IFCs 108 to forward payload data units from un-encapsulated MPLS packets. In this respect, interconnection module 130 may map IFCs 102 to particular ACs 111. Upon receiving an MPLS packet via one of input links 104 and a corresponding one of IFCs 102, control unit 112 may forward this MPLS packet to interconnection module 130. Interconnection module 130 may determine, based on the inner label, to which of L2 IFCs 108 to forward the PDU of the MPLS packet.

In this respect, interconnection module 130 may comprise a P2MP PW demultiplexor that resolves the one of ACs 111 responsible for forwarding the PDU of the MPLS packet. Interconnection module 130 may, in this instance, map an outer label (or P2MP LSP) to inner labels (or P2MP PWs) and store a data structure, such as a table that maps the inner labels to particular L2 IFCs 108 for delivery to a given customer network. This data structure that defines this mapping may represent the above described context-specific label space. Interconnection module 130 may store a plurality of these data structures that each defines a mapping keyed on the outer label. In other words, interconnection module 130 may pop the outer label and select one of the plurality of data structures defining the mapping between inner labels (or P2MP PWs) and particular L2 IFCs 108. In this respect, the outer label may identify a context in which to understand or otherwise interpret the inner label. Interconnection module 130 may then pop the inner label and access the selected or identified one of the context-specific label spaces to determine on which of the L2 IFCs 108 to forward the payload of the MPLS packet.

The architecture of router 100 illustrated in FIG. 6 is shown for exemplary purposes only. The invention is not limited to this architecture. In other embodiments, router 100 may be configured in a variety of ways. In one embodiment, for example, some of the functionally of control unit 112 may be distributed within IFCs 102 or L2 IFCs 108. In another embodiment, control unit 112 may include a routing engine that performs routing functions and maintains a routing information base (RIB), e.g., routing information 116, and a forwarding engine that performs packet forwarding based on a forwarding information base (FIB) generated in accordance with the RIB. Control unit 112 may be implemented solely in software, or hardware, or may be implemented as a combination of software, hardware, or firmware. For example, control unit 112 may include one or more processors which execute software instructions. In that case, the various software modules of control unit 112, such as protocols 118, may comprise executable instructions stored on a computer-readable medium, such as computer memory or hard disk.

Figure 7:
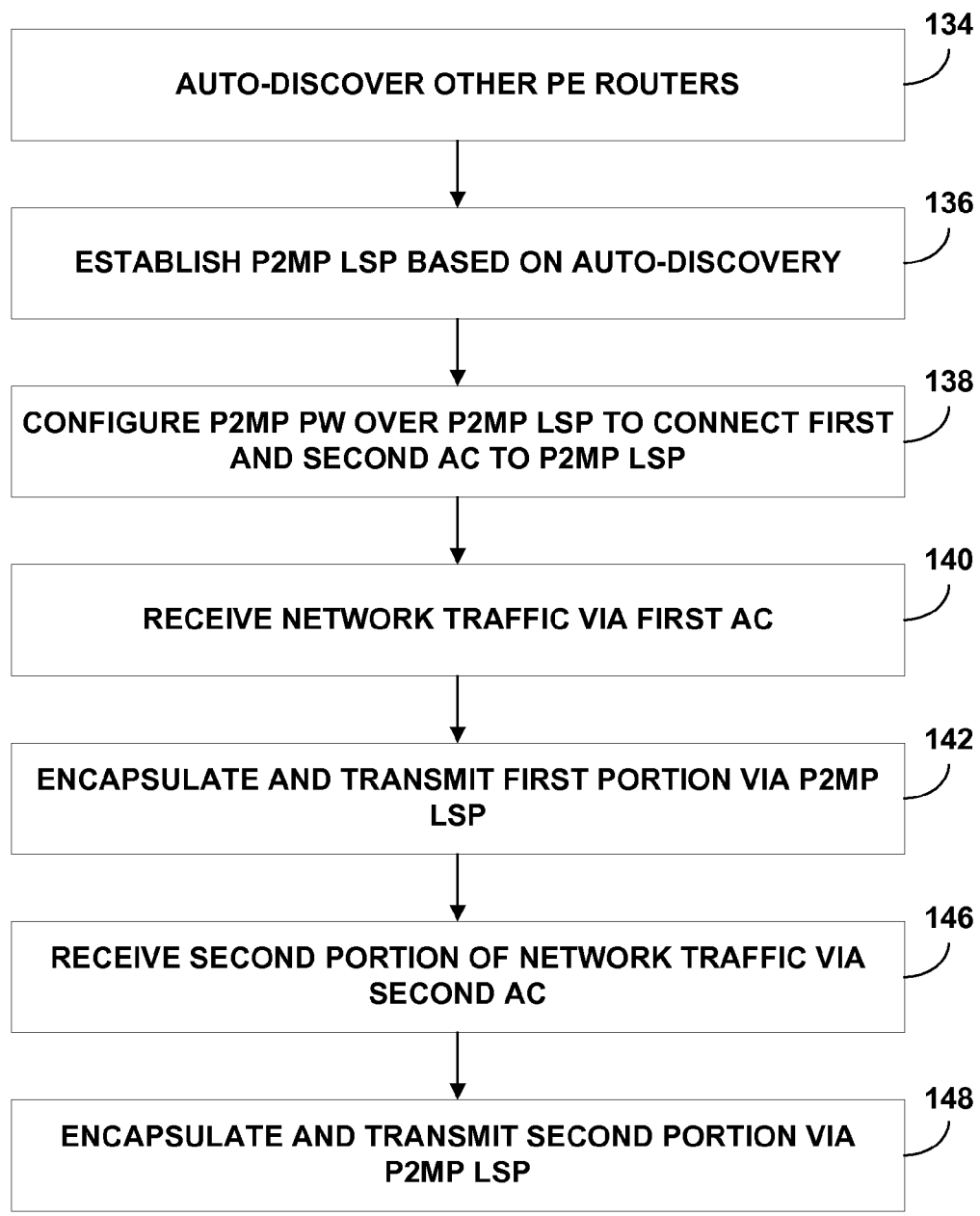
FIG. 7 is a flowchart illustrating example operation of a network device in performing the techniques described herein.

FIG. 7 is a flowchart illustrating example operation of a network device, such as router 100 of FIG. 6, in performing the techniques described herein. It is assumed, for purposes of illustration, that router 100 represents a source or ingress network device, such as SE router 82 of FIG. 5. Although described with respect to ingress network devices, the techniques may apply, as described above, to egress network devices.

Initially, a control unit 112 of router 100 performs auto-discovery to discover other PE routers, such as RE routers 84, as described above (134). In particular, auto-discovery module 128 performs auto-discovery to determine memberships to a particular VPLS, or in this instance, MVPN service. Based on this auto-discovery, control unit 112 by executing RSVP 120, for example, may establish a P2MP LSP, such as P2MP LSP 80 of FIG. 5 (136). Interconnection module 130 may learn of the label associated with P2MP LSP and add an entry to a table maintained by interconnection module 130 to reflect the newly established P2MP LSP. The new entry may store the outer label or MPLS label associated with the newly established P2MP LSP and an outbound one of IFCs 102. After establishing the P2MP LSP, control unit 112 may perform upstream signaling to signal one or more P2MP PWs over the P2MP LSP. In particular, control unit 112 may execute one of protocols 118, such as LDP 126, to perform upstream signaling to signal one or more P2MP PWs that connect a first and second AC 111 to the same P2MP LSP, e.g., P2MP LSP 80 (138).

Control unit 112 may signal the P2MP PWs based on a user configuration received via user interface 132 or alternatively, automatically (or without user intervention), in response to receiving traffic from a source network included within the auto-discovered MVPN. For example, depending on the connectivity of the downstream leaf PE devices to the leaf CE devices, as may be learned via auto discovery, control unit 112 may determine which leaf PE device utilizes a maximum number of egress ACs for the L2 traffic to be delivered by the LSP and, based on the determination, signal a separate P2MP PW for each egress AC. If automatically signaled or configured, control unit 112 may receive L2 traffic (i.e., L2 data units such as ATM cells or Ethernet frames) via a particular one of ACs 111 associated with the member source network. Interconnection module 130 may learn of the association between one or more of ACs 111 and the P2MP PW signaled by control unit 112. If manually configured, interconnection module 130 may receive the configuration information defining this association, similar to the above described configuration information.

In this manner, interconnection module 130 may receive or learn the P2MP PW labels assigned upstream for each of the first and second P2MP PWs and an association between each of the first and second P2MP PWs and one or more of ingress ACs 111. Interconnection module 130 may then communicate with AC module 114 to determine to which of L2 IFCs 108 each of the one or more ingress ACs 111 correspond. Interconnection module 130 may update the corresponding entry in the table or other data structure to reflect that association between L21FCs 108 and P2MP PWs, as well as, the inner label used for each of the P2MP PWs.

Control unit 112 may then receive a first portion of L2 traffic via a first one of ACs 111 associated with a first one of L2 IFCs 108 and forward this L2 traffic to interconnection module 130 (140). Interconnection module 130 may determine the one of ACs 111 on which the L2 traffic arrived and perform a lookup on the table using the determined one of ACs 111 as a key to retrieve a corresponding entry. Interconnection module 130 may, based on the entry, determine both the inner and outer label and append the inner and outer labels to the L2 network traffic, where the outer labels identifies the P2MP LSP and each of the inner labels identifies a corresponding one of the one or more P2MP PWs. Interconnection module 130 may then forward the encapsulated network traffic as MPLS packets via one of IFCs 102 associated with the P2MP LSP. The entry again may identify the one of IFCs 102 associated with the P2MP LSP, as described above. Interconnection module 130 may therefore encapsulate and forward the first portion of the network traffic via the P2MP LSP in this manner (142).

Control unit 112 may then receive a second portion of L2 traffic via a second one of ACs 111 associated with a second one of L2 IFCs 108 and forward this L2 traffic to interconnection module 130 (140). Interconnection module 130 may determine the one of ACs 111 on which the L2 traffic arrived and perform a lookup on the table using the determine one of ACs 111 as a key to retrieve a corresponding entry. Interconnection module 130 may, based on the entry, determine both the inner and outer label and append the inner and outer labels to the L2 network traffic, where the outer labels identifies the P2MP LSP and the inner label identifies the P2MP PW. Interconnection module 130 may then forward the encapsulated network traffic as MPLS packets via the one of IFCs 102 associated with the P2MP LSP. The entry again may identify the one of IFCs 102 associated with the P2MP LSP, as described above. Interconnection module 130 may therefore encapsulate and forward the second portion of the network traffic via the P2MP LSP in this manner (142).

In other words, router 100 may connect, by way of logical connections maintained by interconnection module 130, two or more L2 IFCs 108 to a single P2MP LSP. More generally, router 100 may connect one or more ACs 111 to the same P2MP LSP in order to limit or reduce network overhead within transit routers. While described herein with respect to connecting multiple IFCs 108, the techniques may apply to connect multiple ACs 111 of the same one of IFCs 108 to a single P2MP LSP. Moreover, while described above with respect to L2 IFCs 108, router 100 may include L2 or lower layer IFCs and may implement the techniques to connect one or more L2 or lower layer IFCs to the same P2MP LSP via the P2MP PW abstraction. The P2MP PW abstraction defines both PW labels and a PW demultiplexer that devices at the edges of a PSN utilize to push native service emulation and the associated overhead to the edge of the network, thereby reducing overhead for transit network devices.

In some instances, multiple P2MP PWs may be established over the same P2MP LSP in the manner described above, where each P2MP PW may emulate a different native service. In these instances, a source network may couple to an ingress network device via multiple links, each link coupling to the ingress network device via a separate interface. Rather than establish a separate LSP for each interface, the ingress network device may implement the techniques described herein to establish a single P2MP LSP and multiple P2MP PWs over the same P2MP LSP, each P2MP PW emulating a different native service for each of the links. As the P2MP PWs may span at least two interface cards, the techniques may facilitate connecting two L2 interface cards to a single P2MP LSP via the P2MP PW abstraction. Thus, the techniques may reduce transit state information by reducing the number of P2MP LSP within the PSN and pushing PW emulation to the edge of the PSN, thereby eliminating state information for (e.g., making transparent) PWs within transit devices.

Various embodiments of the invention have been described. These and other embodiments are within the scope of the following claims.

The invention claimed is:

1. A method comprising:
   establishing, with a source device of a computer network, a point to multi-point (P2MP) label switched path (LSP) that connects the source device to multiple receiver devices included within the computer network, where the source device is configured to operate as an ingress to the P2MP LSP and the multiple receiver devices are configured to operate as egresses for the P2MP;
   connecting, with the source device, two or more ingress layer two (L2) interfaces of the source device to the P2MP LSP; and
   forwarding, with the source device, L2 data units from the two or more ingress L2 interfaces to the multiple receiver devices via the P2MP LSP.

2. The method of claim 1,
   wherein the two or more ingress L2 interfaces comprise two or more of a plurality of ingress attachment circuits (ACs) of the source device, and
   wherein connecting the ingress L2 interfaces comprises:
   for each of the ACs of the source device, signaling, with the source device, a corresponding PW label identifying a P2MP Pseudo Wire (PW) to the multiple receiver devices to establish the plurality of P2MP PWs over the same P2MP LSP; and
   mapping the plurality of ingress ACs to the P2MP Pseudo Wires (PWs) to connect the plurality of ACs to the P2MP LSP.

3. The method of claim 2, further comprising connecting the P2MP PW to at least one egress AC within one of the multiple receiver devices.

4. The method of claim 3, wherein connecting the P2MP PW to at least one egress AC comprises mapping packets received on an incoming link of the receiver device associated with the P2MP PW to the at least one egress AC.

5. The method of claim 2, wherein forwarding L2 traffic comprises:
   receiving the L2 data units from one or more L2 networks over the two or more ingress ACs of the source device;
   selecting, with the source device, an inner label for each of the L2 data units to correspond to the ingress AC of the source device by which the L2 data units was received to identify the P2MP PW;
   encapsulating each of the L2 data units in a Multi-Protocol Label Switching (MPLS) packet by appending to each of the L2 data units an outer label that identifies the P2MP LSP and the inner label selected for the L2 data unit to identify the P2MP PW; and
   forwarding the MPLS packets via the P2MP LSP connected to the ingress ACs.

6. The method of claim 5, further comprising:
   receiving the MPLS packet from the P2MP LSP with one of the multiple receiver devices, wherein the one of the multiple receiver devices stores first and second mapping data, wherein the first mapping data maps the outer label of the MPLS packet to one of a plurality of context-specific label spaces, wherein the one of the plurality of context-specific label spaces comprises the second mapping data that maps the inner label of the MPLS packet to at least one egress AC of the one of the multiple receiver devices;
   retreiving the outer and inner labels from the MPLS packet;
   accessing the first mapping data in response to retrieving the outer label to select the one of the context-specific label spaces associated with the outer label;
   accessing, in response to selecting the one of the context-specific label spaces, the second mapping to determine, based on the inner label, the at least one egress AC of the one of the multiple receiver devices on which to forward the L2 data units;
   retrieving the L2 data units encapsulated within the MPLS packet; and
   forwarding the L2 data units on the at least one egress AC of the one of the multiple receiver devices associated with the inner label.

7. The method of claim 1, wherein establishing the P2MP LSP comprises:
   with the source device, automatically discovering the multiple receiver devices; and
   with the source device, establishing the P2MP LSP to connect the source device to the automatically discovered receiver devices.

8. The method of claim 1, wherein forwarding L2 traffic comprises:
   receiving the L2 data units on the two or more ingress L2 interfaces of the source device;
   encapsulating the L2 data units in a Multi-protocol Label Switching (MPLS) packet; and
   forwarding the MPLS packet on the P2MP LSP connected to the two or more ingress L2 interfaces.

9. The method of claim 8, further comprising:
   receiving the MPLS packet from the P2MP LSP on one of the multiple receiver devices;
   retrieving the L2 data units encapsulated within the MPLS packet; and
   forwarding the L2 data units on at least one egress L2 interface connected to the P2MP LSP.

10. The method of claim 1, further comprising:
    transporting L2 data units via the P2MP LSP; and
    duplicating the L2 data units at an intermediate device associated with the P2MP LSP when two or more branch LSPs of the P2MP LSP originate at the intermediate device.

11. The method of claim 1, further comprising:
    transporting L2 data units via the P2MP LSP; and
    duplicating the L2 data units at one of the receiver devices when two or more egress L2 interfaces of the receiver device are connected to the P2MP LSP.

12. The method of claim 1, wherein connecting the two or more ingress L2 interfaces to the P2MP LSP comprises mapping L2 data units received on the two or more ingress L2 interfaces to at least one outgoing network link of the source device associated with the P2MP LSP.

13. The method of claim 1,
    wherein the computer network comprises a Multi-protocol Label Switching (MPLS) network, wherein the two or more ingress L2 interfaces couple one or more L2 source networks to the source device,
wherein at least one egress L2 interface couples one of the multiple receiver devices to at least one L2 customer network, and
wherein the source device and the receiver devices are routers.

14. A network device comprising:
at least one layer two (L2) interface card having two or more ingress L2 interfaces; and
a control unit that establishes a point to multi-point (P2MP) label switched path (LSP) through a computer network to connect, as a source device, the network device to multiple receiver devices and connect the two or more ingress L2 interfaces to the P2MP LSP, where the source device is configured to operate as an ingress to the P2MP LSP and the multiple receiver devices are configured to operate as egresses for the P2MP, and
wherein the at least one L2 interface card forwards L2 data units from the two or more ingress L2 interfaces to the multiple receiver devices via the P2MP LSP.

15. The network device of claim 14,
wherein the two or more ingress L2 interfaces comprise two or more of a plurality of ingress attachment circuits (ACs), and
wherein the control unit further, for each of the ACs of the source device, signals a corresponding PW label identifying a P2MP Pseudo Wire (PW) to the multiple receiver devices to establish the plurality of P2MP PWs over the same P2MP LSP, and maps the plurality of ingress ACs to the established P2MP Pseudo Wires (PWs) to connect the plurality of ACs to the P2MP LSP.

16. The network device of claim 15,
wherein the L2 interface cards receive the L2 data units from one or more L2 networks on one of the ingress ACs of the source device, and
wherein the control unit includes an interconnection module that selects an inner label for each of the L2 data units to correspond to the ingress AC of the source device by which the L2 data units was received to identify the P2MP PW, encapsulates each of the L2 data units in a Multi-Protocol Label Switching (MPLS) packet by appending to the L2 data units an outer label that identifies the P2MP LSP and an inner label selected for the L2 data units to identify the P2MP PW, and forwards the MPLS packet via the P2MP LSP connected to the ingress ACs.

17. The network device of claim 14,
wherein the control unit includes an auto-discover module that automatically discovers the multiple receiver devices, and
wherein the control unit establishes the P2MP LSP to connect the source device to the automatically discovered receiver devices.

18. The network device of claim 14,
wherein the L2 interface cards receive L2 data units on the two or more ingress L2 interfaces of the source device,
wherein the control unit includes an interconnection module that encapsulates the L2 data units in a Multi-protocol Label Switching (MPLS) packet and forwards the MPLS packet on the P2MP LSP connected to the two or more ingress L2 interfaces.

19. The network device of claim 14, wherein the control unit includes an interconnection module that maps L2 data units received on the two or more ingress L2 interfaces to at least one outgoing network link of the source device associated with the P2MP LSP.

20. The network device of claim 14,
wherein the computer network comprises a Multi-protocol Label Switching (MPLS) network,
wherein the two or more ingress L2 interfaces couple one or more L2 source networks to the network device, and
wherein the source device and the receiver devices are routers.

21. A non-transitory computer-readable storage medium comprising instructions that cause a programmable processor to:
establish, with a source device of a computer network, a point to multi-point (P2MP) label switched path (LSP) that connects the source device to multiple receiver devices included within the computer network, where the source device is configured to operate as an ingress to the P2MP LSP and the multiple receiver devices are configured to operate as egresses for the P2MP;
connect, with the source device, two or more ingress layer two (L2) interfaces of the source device to the P2MP LSP; and
forward, with the source device, L2 data units from the two or more ingress L2 interfaces to the multiple receiver devices via the P2MP LSP.

22. The non-transitory computer-readable storage medium of claim 21,
wherein the two or more ingress L2 interfaces comprise two or more of a plurality of ingress attachment circuits (ACs) of the source device, and
wherein the instructions cause the programmable processor to connect the ingress L2 interfaces by:
for each of the ACs of the source device, signaling, with the source device, a corresponding PW label identifying a P2MP Pseudo Wire (PW) to the multiple receiver devices to establish the plurality of P2MP PWs over the same P2MP LSP; and
mapping the plurality of ingress ACs to the P2MP Pseudo Wires (PWs) to connect the plurality of ACs to the P2MP LSP.

23. The non-transitory computer-readable storage medium of claim 22, wherein the instructions further cause the programmable processor to:
receive the L2 data units on one of the ingress ACs of the source device;
encapsulate the L2 data units in a Multi-Protocol Label Switching (MPLS) packet by appending to the L2 data units an outer label that identifies the P2MP LSP and an inner label that identifies the P2MP PW; and
forward the MPLS packet via the P2MP LSP connected to the ingress ACs.

24. A system comprising:
a computer network;
multiple receiver network devices included within the computer network; and
a source network device included within the computer network that includes:
at least one layer two (L2) interface card having two or more ingress L2 interfaces; and
a control unit that establishes a point to multi-point (P2MP) label switched path (LSP) through a computer network to connect the source network device to multiple receiver devices and connect the two or more ingress L2 interfaces to the P2MP LSP, where the source device is configured to operate as an ingress to the P2MP LSP and the multiple receiver devices are configured to operate as egresses for the P2MP, and wherein the at least one L2 interface card forwards L2 data units from the two or more ingress L2 interfaces to the multiple receiver devices via the P2MP LSP.

25. The system of claim 24,
wherein the two or more ingress L2 interfaces comprise two or more of a plurality of ingress attachment circuits (ACs), and
wherein the control unit further, for each of the ACs of the source device, signals a corresponding PW label identifying a P2MP Pseudo Wire (PW) to the multiple receiver devices to establish the plurality of P2MP PWs over the same P2MP LSP, and maps the plurality of ingress ACs to the established P2MP Pseudo Wires (PWs) to connect the plurality of ACs to the P2MP LSP.

26. The system of claim 25,
wherein the L2 interface cards receive the L2 data units on one of the ingress ACs, and
wherein the control unit includes an interconnection module that encapsulates the L2 data units in a Multi-Protocol Label Switching (MPLS) packet by appending to the L2 data units an outer label that identifies the P2MP LSP and an inner label that identifies the P2MP PW, and forwards the MPLS packet via the P2MP LSP connected to the ingress ACs.

27. The system of claim 26, wherein the multiple receiver devices each includes:
at least one egress AC that receives the MPLS packet from the P2MP LSP and is associated with the inner label identifying the P2MP PW; and
a control unit that retrieves the L2 data units encapsulated within the MPLS packet, and forwards the L2 data units on the at least one egress AC associated with the inner label.

28. The system of claim 25, wherein each of the multiple receiver devices comprises:
one or more L2 interface cards, each of which include one or more egress ACs; and
a control unit that connects the P2MP PW to at least one egress AC by mapping packets received on an incoming link of each of the respective multiple receiver devices associated with the P2MP PW to one of the one or more egress ACs.

29. The system of claim 24,
wherein the control unit includes:
a signaling protocol to establish the P2MP LSP; and
an auto-discovery module that automatically discovering the multiple receiver devices, wherein the signaling protocol establishes the P2MP LSP to connect the source device to the automatically discovered receiver devices.

30. The system of claim 24,
wherein the L2 interface cards receive the L2 data units from one or more L2 networks on one of the ingress ACs of the source device, and
wherein the control unit includes an interconnection module that selects an inner label for each of the L2 data units to correspond to the ingress AC of the source device by which the L2 data units was received to identify the P2MP PW, encapsulates each of the L2 data units in a Multi-Protocol Label Switching (MPLS) packet by appending to the L2 data units an outer label that identifies the P2MP LSP and an inner label selected for the L2 data units to identify the P2MP PW, and forwards the MPLS packet via the P2MP LSP connected to the ingress ACs.

31. The system of claim 30, wherein each of the multiple receiver devices include:
at least one egress L2 interface connected to the P2MP LSP
a control unit stores first and second mapping data, wherein the first mapping data maps the outer label of the MPLS packet to one of a plurality of context-specific label spaces, wherein the one of the plurality of context-specific label spaces comprises the second mapping data that maps the inner label of the MPLS packet to the at least one egress L2 interface,
wherein the control unit further receives the MPLS packet from the P2MP LSP, retrieves the outer and inner labels from the MPLS packet, accesses the first mapping data in response to retrieving the outer label to select the one of the context-specific label spaces associated with the outer label, accesses, in response to selecting the one of the context-specific label spaces, the second mapping to determine, based on the inner label, the at least one egress L2 interfaces on which to forward the L2 data units, and retrieves the L2 data units encapsulated within the MPLS packet, and
wherein the at least one egress L2 interface forwards the retrieved L2 data units.

32. The system of claim 24, further comprising a transit network device positioned between the source device and at least one of the multiple receiver devices that transports the L2 data units via the P2MP LSP, the transit network device including a control unit that duplicates the L2 data units at an intermediate device associated with the P2MP LSP when two or more branch LSPs of the P2MP LSP originate at the intermediate device.

33. The system of claim 24,
wherein the computer network comprises a Multi-protocol Label Switching (MPLS) network,
wherein the two or more ingress L2 interfaces couple one or more L2 source networks to the source device,
wherein each of the multiple receiver devices includes at least one egress L2 interface that couples to at least one L2 customer network, and
wherein the source device and the receiver devices are routers.

34. A network device comprising:
at least one layer two (L2) interface card having one or more egress L2 interfaces; and
a control unit that establishes a point to multi-point (P2MP) label switched path (LSP) through a computer network to connect a source network device the network device, as one of multiple receiver devices, and connect one or more of the egress L2 interfaces to the P2MP LSP, where the source device is configured to operate as an ingress to the P2MP LSP and the multiple receiver devices are configured to operate as egresses for the P2MP,
wherein the at least one L2 interface card receives Multi-Protocol Label Switching (MPLS) packets from the source device via the P2MP LSP, wherein the MPLS packets include a L2 data unit, an outer label that identifies the P2MP LSP and an inner label selected for the L2 data unit to identify the P2MP PW,
wherein the control unit stores first and second mapping data, wherein the first mapping data maps the outer label of the MPLS packet to one of a plurality of context-specific label spaces, wherein the one of the plurality of context-specific label spaces comprises the second mapping data that maps the inner label of the MPLS packet to the at least one egress L2 interface,
wherein the control unit further receives the MPLS packet from the P2MP LSP, retrieves the outer and inner labels from the MPLS packet, accesses the first mapping data in response to retrieving the outer label to select the one of the context-specific label spaces associated with the outer label, accesses, in response to selecting the one of the context-specific label spaces, the second mapping to determine, based on the inner label, the at least one egress L2 interfaces on which to forward the L2 data units, and retrieves the L2 data units encapsulated within the MPLS packet, and wherein the at least one egress L2 interface forwards the retrieved L2 data units.

\* \* \* \* \*